(12) United States Patent
Matsuki et al.

(10) Patent No.: US 11,860,644 B2
(45) Date of Patent: Jan. 2, 2024

(54) FLYING DEVICE, FLIGHT CONTROL DEVICE, AND FLYING CONTROL METHOD

(71) Applicant: KDDI CORPORATION, Tokyo (JP)

(72) Inventors: Tomoaki Matsuki, Tokyo (JP); Masafumi Hirono, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 275 days.

(21) Appl. No.: 16/468,151

(22) PCT Filed: Dec. 6, 2017

(86) PCT No.: PCT/JP2017/043779
§ 371 (c)(1),
(2) Date: Jun. 10, 2019

(87) PCT Pub. No.: WO2018/110382
PCT Pub. Date: Jun. 21, 2018

(65) Prior Publication Data
US 2021/0287557 A1    Sep. 16, 2021

(30) Foreign Application Priority Data

Dec. 12, 2016   (JP) .................................. 2016-240247
Jan. 11, 2017   (JP) .................................. 2017-002637

(51) Int. Cl.
*G08G 5/00*      (2006.01)
*H04B 17/318*    (2015.01)
(Continued)

(52) U.S. Cl.
CPC ............. *G05D 1/10* (2013.01); *G08G 5/0013* (2013.01); *G08G 5/0039* (2013.01);
(Continued)

(58) Field of Classification Search
None
See application file for complete search history.

(56) References Cited

U.S. PATENT DOCUMENTS

2010/0017114 A1    1/2010 Tehan
2015/0281906 A1*  10/2015 Tseng ..................... H04W 4/46
                                              455/456.3
(Continued)

FOREIGN PATENT DOCUMENTS

CN    202694592 U    1/2013
CN    105323821 A    2/2016
(Continued)

OTHER PUBLICATIONS

International Search Report with English translation issued in corresponding application No. PCT/JP2017/043779 dated Feb. 20, 2018.
(Continued)

*Primary Examiner* — Shardul D Patel
*Assistant Examiner* — Madison R Hughes
(74) *Attorney, Agent, or Firm* — Foley & Lardner LLP

(57) ABSTRACT

A flying device is provided, which includes: an acquisition unit that acquires communication quality information with which position information indicating a position and the communication quality at a position indicated by the position information are associated; a flight position identification unit that identifies a flight position, which is an in-flight position; a path determination unit that determines a flight path on the basis of the communication quality associated with the position information corresponding to the flight position in the communication quality information; and a flight control unit that controls a flying mechanism on the basis of the flight path determined by the path determination unit.

18 Claims, 15 Drawing Sheets

(51) Int. Cl.

| | | |
|---|---|---|
| *H04W 36/30* | (2009.01) | |
| *H04W 36/32* | (2009.01) | |
| *G05D 1/10* | (2006.01) | |
| *H04W 28/24* | (2009.01) | |
| G05D 1/00 | (2006.01) | |
| A62B 33/00 | (2006.01) | |
| B64C 13/18 | (2006.01) | |
| B64C 39/02 | (2023.01) | |
| B64D 47/00 | (2006.01) | |
| G01C 21/34 | (2006.01) | |
| G08B 25/04 | (2006.01) | |
| G08B 25/10 | (2006.01) | |
| H04M 11/00 | (2006.01) | |
| H04W 4/02 | (2018.01) | |
| H04W 84/00 | (2009.01) | |

(52) U.S. Cl.
CPC ......... *G08G 5/0069* (2013.01); *G08G 5/0091* (2013.01); *H04B 17/318* (2015.01); *H04W 28/24* (2013.01); *H04W 36/305* (2018.08); *H04W 36/32* (2013.01).

(56) References Cited

U.S. PATENT DOCUMENTS

| | | | |
|---|---|---|---|
| 2016/0031459 A1* | 2/2016 | Murren | B61L 27/14 701/22 |
| 2016/0070265 A1* | 3/2016 | Liu | G01C 21/00 701/25 |
| 2016/0140851 A1* | 5/2016 | Levy | G08G 5/045 701/3 |
| 2016/0371985 A1 | 12/2016 | Kotecha | |
| 2016/0371987 A1 | 12/2016 | Kotecha | |
| 2017/0025021 A1* | 1/2017 | Song | G08G 5/0013 |
| 2017/0328683 A1* | 11/2017 | Smith | F41G 7/346 |
| 2018/0004207 A1* | 1/2018 | Michini | B64C 39/024 |
| 2019/0146502 A1* | 5/2019 | Petkov | G05D 1/0094 701/408 |
| 2019/0235526 A1* | 8/2019 | Chen | G05D 1/08 |

FOREIGN PATENT DOCUMENTS

| | | |
|---|---|---|
| CN | 105824324 A | 8/2016 |
| CN | 106184753 A | 12/2016 |
| JP | 2001-069059 A | 3/2001 |
| JP | A-2003-005833 | 1/2003 |
| JP | A-2005-025516 | 1/2005 |
| JP | A-2008-308154 | 12/2008 |
| JP | A-2010-177851 | 8/2010 |
| JP | 2015-005915 A | 1/2015 |
| JP | 2015123793 A * | 7/2015 |
| JP | 2015-207149 A | 11/2015 |
| JP | 2016-058929 A | 4/2016 |
| JP | A-2016-174360 | 9/2016 |
| JP | A-2016-181123 | 10/2016 |
| JP | 2017-228178 A | 12/2017 |
| WO | WO-2016/106746 A1 | 7/2016 |
| WO | WO-2016/142967 A1 | 9/2016 |
| WO | WO-2016/162899 A1 | 10/2016 |

OTHER PUBLICATIONS

Office Action issued in corresponding Japanese application No. 2018-141322 dated Jun. 25, 2019 with English translation.
Office Action issued in corresponding Chinese Application No. 201780075646.8 dated Jan. 14, 2022 with partial English translation (Search Report section only).

* cited by examiner

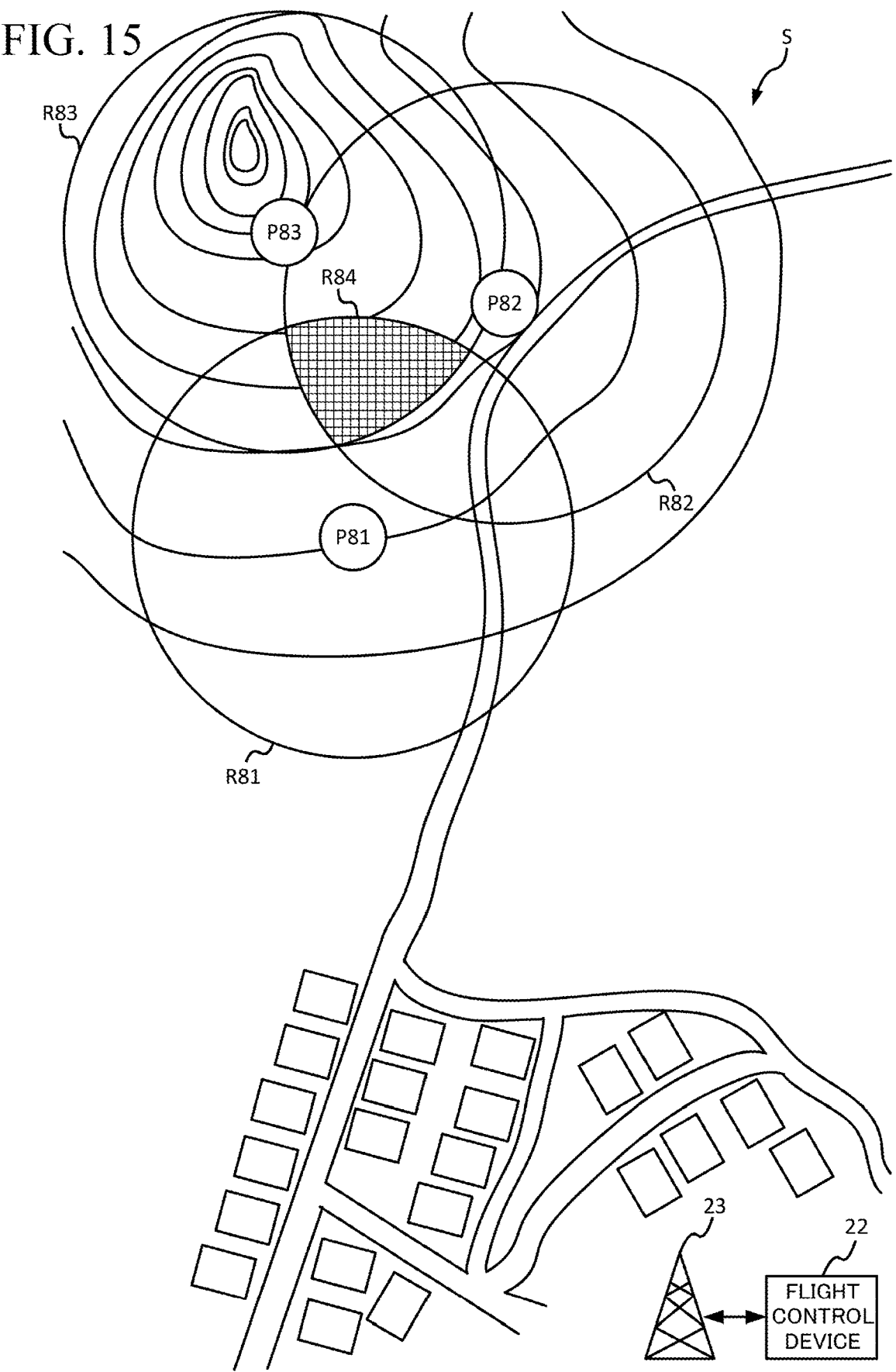

FLYING DEVICE, FLIGHT CONTROL DEVICE, AND FLYING CONTROL METHOD

TECHNICAL FIELD

The present invention relates to a flying device, a flight control device, and a flying control method.

Priority is claimed on Japanese Patent Application Nos. 2016-240247 and 2017-002637, filed Dec. 12, 2016, and Jan. 11, 2017, respectively, the contents of which are incorporated herein by reference.

BACKGROUND ART

Flying devices known as drones that can be subjected to remote control have recently come into widespread use. Patent Literature 1 discloses technology for transmitting data for controlling a flying device from a terminal used to operate the flying device to the flying device via a radio link.

CITATION LIST

Patent Literature

[Patent Literature 1]
Japanese Unexamined Patent Application, First Publication No. 2016-174360
[Patent Literature 2]
Japanese Unexamined Patent Application, First Publication No. 2010-177851

SUMMARY OF INVENTION

Problems to be Solved by the Invention

In a case where a user controls a flying device located at a position which radio signals transmitted by a control device for controlling the flying device do not reach, the control device needs to transmit/receive various pieces of control information to/from the flying device via a mobile telephone network. However, communication quality of a mobile telephone network is changed by influences such as a base station being down, rain, wind, temperature, and so on. For this reason, the control device cannot always transmit/receive the various pieces of control information to/from the flying device via a mobile telephone network.

Therefore, the present invention was made in view of these points, and is directed to providing a flying device that can be flown even if communication quality of a mobile telephone network is changed, a flight control device, and a flying control method.

Means for Solving the Problem

A flying device of a first aspect of the present invention includes: an acquisition unit configured to acquire communication quality information with which positional information indicating a position and communication quality at the position indicated by the positional information are associated; a flight position identification unit configured to identify a flight position that is an in-flight position; a path determination unit configured to determine a flight path on the basis of the communication quality associated with the positional information corresponding to the flight position in the communication quality information; and a flight control unit configured to control a flying mechanism on the basis of the flight path determined by the path determination unit.

The flying device of the first aspect of the present invention may further include a communication control unit configured to receive control information transmitted by a control device for controlling the flying device. The path determination unit may determine the flight path on the basis of the communication quality in a case where the communication control unit is unable to receive the control information.

The path determination unit may determine the flight path in a direction of a position at which the communication quality of a radio communication line through which the control information is transmitted is greater than or equal to a threshold.

The flying device of the first aspect of the present invention may further include a storage unit configured to store a destination. The path determination unit may determine the flight path that includes a position at which the communication quality between the flight position and the destination is greater than or equal to a threshold.

The path determination unit may determine the flight path that includes a position at which the communication quality is greater than or equal to a threshold among positions within a prescribed angle range centering on a direction of the destination. Further, the path determination unit may determine the flight path that includes a position in a direction closest to a direction of the destination among positions at which the communication quality is greater than or equal to the threshold.

The flying device of the first aspect of the present invention may further include an environment identification unit configured to identify an ambient environment of the flight position. The path determination unit may determine the flight path further on the basis of the ambient environment identified by the environment identification unit.

The path determination unit may determine the flight path that includes a position at which the ambient environment meets a prescribed condition among positions at which the communication quality is greater than or equal to the threshold.

The path determination unit may determine the flight path on the basis of a change in situation of the communication quality. Further, the path determination unit may change a frequency with which the flight path is determined on the basis of a change degree of the communication quality. The path determination unit may change a frequency with which the flight path is determined on the basis of an update frequency of the communication quality information.

In the flying device of the first aspect of the present invention, the flight control unit performs control to make a flight within a prescribed distance range to the ground on the basis of map data including height information, and the acquisition unit further acquires area information that indicates an area where radio signals of a base station of a mobile telephone network do not reach. The flying device may further includes a communication control unit configured to transmit an announcement signal which a portable terminal is able to receive and receive a response signal to the announcement signal when the identified flight position enters an area indicated by the area information, and an output unit configured to output announcement information that indicates that the response signal is received in a case where the communication control unit receives the response signal.

The acquisition unit further may acquire the flight path within the area indicated by the area information, and the flight control unit may perform control to make a flight along the flight path on the basis of the flight position.

The acquisition unit may acquire the area information that includes radio signal state information that indicates distribution of strengths of the radio signals of the base station, and the communication control unit may detect entrance into the area where the radio signals of the base station do not reach on the basis of the flight position and the radio signal state information.

The communication control unit may transmit the announcement signal under condition that the strengths of the radio signals of the base station are smaller than or equal to a prescribed threshold.

The communication control unit may transmit the announcement signal that includes identification information of the portable terminal that is a search target.

The output unit may output the announcement information in a case where the response signal which the communication control unit receives includes identification information of the portable terminal that is a search target.

The output unit may output the announcement information that includes the flight position at a point in time when the response signal is received.

The communication control unit may transmit a plurality of announcement signals at a plurality of different timings and receives a plurality of response signals to the plurality of announcement signals, and the output unit may output the announcement information that includes the flight position at a time of receiving the response signal with a highest radio signal strength when receiving the plurality of response signals.

The output unit may transmit the announcement information to the base station at a position at which radio signal strength of the base station is greater than or equal to a prescribed value, and thereby transmit the announcement information to a prescribed transmission destination.

A flight control device of a second aspect of the present invention includes: an information transmitter configured to transmit a flight path within an area where radio signals of a base station of a mobile telephone network do not reach to a flying device; an information receiver configured to receive announcement information indicating reception of a response signal from a portable terminal in response to an announcement signal transmitted when the flying device is flying over the area where the radio signals of the base station do not reach; and an output unit configured to output the announcement information received by the information receiver.

The information transmitter may transmit different flight paths from each other to a plurality of flying devices, and the information receiver may receive a plurality of pieces of announcement information from the plurality of flying devices.

A flying control method of a third aspect of the present invention causes a computer to execute processes, the processes comprising: acquiring communication quality information with which positional information indicating a position and communication quality at the position indicated by the positional information are associated; identifying a flight position that is an in-flight position; determining a flight path on the basis of the communication quality associated with the positional information corresponding to the flight position in the communication quality information; and controlling a flying mechanism on the basis of the determined flight path.

The flying control method of the third aspect of the present invention may further include: controlling the flying mechanism to make a flight within a prescribed distance range to the ground on the basis of map data including height information; acquiring further area information that indicates an area where radio signals of a base station of a mobile telephone network do not reach, transmitting an announcement signal to be received by a portable terminal and receiving a response signal to the announcement signal when the identified flight position enters into an area indicated by the area information; and outputting announcement information that indicates that the response signal is received in a case where the response signal is received.

Advantageous Effect of the Invention

According to the present invention, it is possible to control a flying device even if a communication quality of a mobile telephone network is changed.

BRIEF DESCRIPTION OF THE DRAWINGS

FIG. 15 is a diagram illustrating a method of identifying the region where the portable terminal M is present on the basis of a plurality of response signals in the second embodiment.

DESCRIPTION OF EMBODIMENTS

Outline of Operation of Flying Device 1 in First Embodiment

Figure 1:
FIG. 1 is a diagram illustrating an outline of an operation of a flying device in a first embodiment.

FIG. 1 is a diagram illustrating an outline of an operation of a flying device 11 in a first embodiment. In FIG. 1, it is assumed that a user causes the flying device 11 to fly toward a destination A0 indicated by an open circle along a flight path FL1 indicated by an arrow, using a control device that controls the flying device 11. The flying device 11 and the control device transmit/receive control information via a mobile telephone network. A portion covered with longitudinal lines in FIG. 1 indicates a region where radio signal strength included in communication quality of the mobile telephone network is at a high level. A portion covered with oblique lines in FIG. 1 indicates a region where the radio signal strength is at a medium level. A portion covered with transverse lines in FIG. 1 indicates a region where the radio signal strength is at a low level. A portion that is not covered in FIG. 1 indicates a region that radio signals of the mobile telephone network do not reach. The mobile telephone network is, for example, an LTE network.

The flying device 11 flies on the basis of the control information transmitted from a control device. In a case where the flying device 11 flies over the region that the radio signals of the mobile telephone network do not reach and cannot receive the control information, the flying device 11 flies on the basis of previously acquired communication quality information. For example, the flying device 11 flies toward a region where the radio signal strength is higher than or equal to the low level. The flying device 11 flies over the region where the radio signal strength is higher than or equal to the low level, and flies on the basis of the control information when it can be made to receive the control information.

Thereby, even in a case where the flying device 11 and the control device cannot communicate with each other, a user who controls the flying device 11 flies it toward a region where the radio signals can be received on the basis of the communication quality information which the flying device 11 acquires previously, and thus is able to control the flying device 11.

Hereinafter, a constitution of the flying device 11 will be described in detail.

Figure 2:
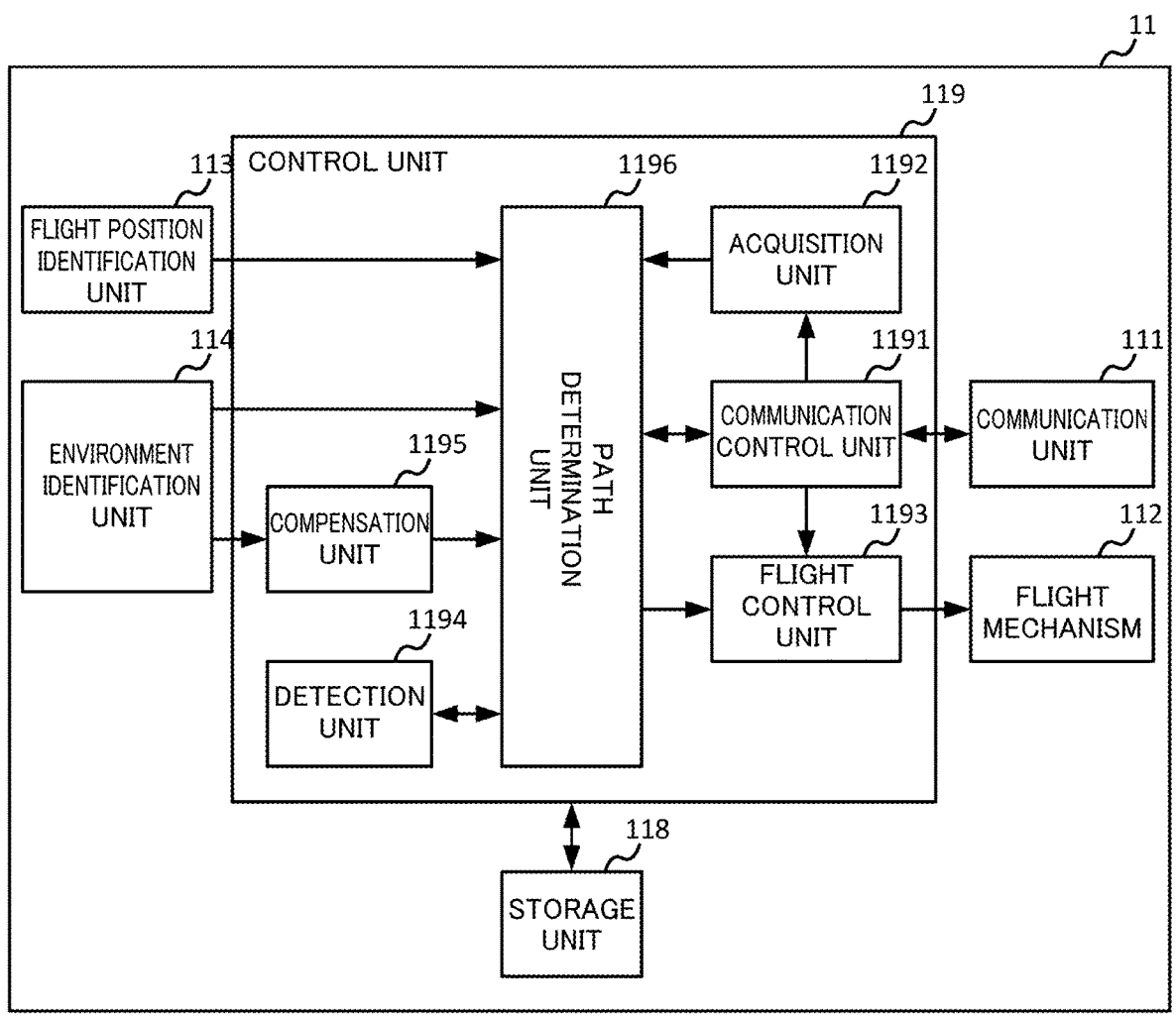
FIG. 2 is a diagram illustrating a constitution of the flying device in the first embodiment.

FIG. 2 is a diagram illustrating a constitution of the flying device in the first embodiment. The flying device 11 includes a communication unit 111, a flying mechanism 112, a flight position identification unit 113, an environment identification unit 114, a storage unit 118, and a control unit 119. The control unit 119 includes a communication control unit 1191, an acquisition unit 1192, a flight control unit 1193, a detection unit 1194, a compensation unit 1195, and a path determination unit 1196.

The communication unit 111 is a radio communication module that transmits/receives radio signals for performing communication using the mobile telephone network. The communication unit 111 has a modulator that modulates transmission data that is input from the communication control unit 1191, and a high-frequency unit that transmits the modulated data as a high-frequency signal of an allocated frequency band. Further, the communication unit 111 has a demodulator that demodulates the high-frequency signal received by the high-frequency unit. The demodulator inputs the demodulated reception data to the communication control unit 1191.

The flying mechanism 112 includes a propeller, a motor that rotates the propeller, and a rudder. The flying mechanism 112 operates these mechanisms on the basis of control of the flight control unit 1193, and thereby can change a flying speed and a flying direction.

The flight position identification unit 113 identifies a flight position that is an in-flight position. To be specific, the flight position identification unit 113 includes, for example, an altimeter, an acceleration sensor, and a Global Positioning System (GPS) receiver, and notifies the path determination unit 1196 of machine information for identifying a state of the flying device 11. The machine information may be information about, for example, a position, altitude, speed, direction, orientation (tilt), wind speed, communication quality, and remaining battery level of the flying device 11. Further, the flight position identification unit 113 may notify the communication control unit 1191 or the flight control unit 1193 of the machine information.

The environment identification unit 114 includes, for example, a wind direction anemometer, an actinometer, a solarimeter, a rain sensor, and a snow sensor, and identifies an ambient environment of the in-flight position. The environment identification unit 114 notifies the compensation unit 1195 and the path determination unit 1196 of the identified ambient environment. Further, the environment identification unit 114 may notify the flight control unit 1193 of the ambient environment.

The storage unit 118 is a storage medium that includes a read only memory (ROM) and a random access memory (RAM). The storage unit 118 stores a program which the control unit 119 executes. Further, the storage unit 118 is used as a work memory of the control unit 119, and temporarily stores, for example, the flight position which the flight position identification unit 113 (to be described below) identifies, or ambient environment information which the environment identification unit 114 (to be described below) detects. Further, the storage unit 118 stores a destination of the flying device 11. The storage unit 118 may store a position where the flying device 11 has flown. The storage unit 118 may further store the radio signal strength of the mobile telephone network which the communication control unit 1191 (to be described below) has detected at a position where the flying device 11 has flown.

The control unit 119 is, for example, a central processing unit (CPU). The control unit 119 executes the program stored in the storage unit 118, and thereby functions as the communication control unit 1191, the acquisition unit 1192, the flight control unit 1193, the detection unit 1194, the compensation unit 1195, and the path determination unit 1196.

The communication control unit 1191 controls the communication unit 111, and connects it to the mobile telephone network. The communication control unit 1191 receives control information which the control device for controlling the flying device 11 transmits. The communication control unit 1191 notifies the flight control unit 1193 of the acquired control information.

In a case where the communication control unit 1191 cannot receive the control information, the communication control unit 1191 notifies at least either of the flight control unit 1193 or the path determination unit 1196 that the communication control unit 1191 cannot receive the control information. The communication control unit 1191 determines that it cannot receive the control information, for example, (1) in a case where the control information cannot be received within a prescribed period, (2) in a case where response information cannot be received within a prescribed period, (3) in a case where throughput is below a prescribed value or (4) in a case where radio signals which a base station sends cannot be received. For example, in a case where data retransmission is performed the prescribed number of times, and in a case where a data error rate is greater than or equal to a threshold, throughput is below a prescribed value, and thus the communication control unit 1191 determines that it cannot receive the control information. Further, the communication control unit 1191 determines that it cannot receive the radio signals which the base station sends, for example, in a case where identification information for identifying a base station cannot be received from a base station of a predetermined mobile telephone network.

In a case where the communication control unit 1191 cannot receive the radio signals of the mobile telephone network when its own device is flying over a position which the radio signals of the mobile telephone network included in the communication quality information acquired by the acquisition unit 1192 (to be described below) reach, the communication control unit 1191 may store radio signal situation information, which indicates that it cannot receive the radio signals at the in-flight position, in the storage unit 118. For example, the communication control unit 1191 sets a communication availability flag associated with positional information in the radio signal situation information stored in the storage unit 118 to a value indicating that it cannot perform communication. The communication control unit 1191 transmits the radio signal situation information to a prescribed terminal when the flying device 11 is flying over a position at which the radio signals of the mobile telephone network can be received. Further, the communication control unit 1191 may transmit the radio signal situation information to a server (a management server) which a provider who provides the communication quality information manages.

The acquisition unit 1192 acquires communication quality information, with which positional information that indicates a position and communication quality at a position indicated by the positional information are associated, via the communication control unit 1191. The communication quality is, for example, information such as radio signal strength of the mobile telephone network, a radio signal interference degree, a transmission speed such as throughput, and impending information such as the number of terminals connected to a base station, and so on. Further, the communication quality information may be, for example, area information that includes information for identifying an area where the radio signals of the mobile telephone network do not reach, or area information that includes information for identifying an area where the radio signals reach.

The communication quality information may be information that is mapped to a flight path determined by the management server on the basis of a departure location and a destination which a user who controls the flying device 11 inputs to the management server. The communication quality information may be information that is generated on the basis of communication quality information which the management server acquires when a plurality of flying devices 11 are in flight. The communication quality information may be, for example, communication quality information that corresponds to a frequency to which the communication unit 111 of the flying device 11 based on a subscriber identity module (SIM) card corresponds. The communication quality information may be area information that includes information for identifying an area where the radio signals of the mobile telephone network do not reach, or area information that includes information for identifying an area where the radio signals reach at an altitude at which the flying device 11 flies. In a case where a flyable height differs in accordance with a fuselage type of the flying device 11, the communication quality information may be area information of an altitude corresponding to the fuselage type. Further, the management server may manage the communication quality information at each frequency of the mobile telephone network.

The acquisition unit 1192 acquires communication quality information from the management server via the base station of the mobile telephone network. The acquisition unit 1192 notifies the path determination unit 1196 of the acquired communication quality information. The acquisition unit 1192 acquires communication quality information associated with specification information of its own device. The specification information of the own device is, for example, machine information of the own device, specification or standards of the communication unit 111, and standards or a type of the subscriber identity module (SIM) card.

The flight control unit 1193 controls the flying mechanism 112 on the basis of the control information which the communication control unit 1191 receives. In a case where the flight control unit 1193 receives a notification that the control information cannot be received from the communication control unit 1191, the flight control unit 1193 controls the flying mechanism 112 on the basis of the flight path which the path determination unit 1196 (to be described below) determines. Further, in the case where the communication control unit 1191 cannot receive the control information, the flight control unit 1193 may control the flying mechanism 112 to stay at a current position.

The detection unit 1194 detects a residual quantity of a battery that supplies power used in flight of the flying device 11. The detection unit 1194 detects, for example, a voltage of the battery, and thereby detects a residual quantity of the battery. The detection unit 1194 notifies the path determination unit 1196 of the detected residual quantity of the battery.

[Method of Determining Flight Path]

The path determination unit 1196 determines a flight path on the basis of the communication quality associated with the positional information corresponding to the flight position in the communication quality information. For example, in a case where the path determination unit 1196 receives a notification that the control information cannot be received from the communication control unit 1191, the path determination unit 1196 determines the flight path on the basis of the communication quality at a position near the flight position. To be specific, the path determination unit 1196 determines the flight path in a direction of a position at which communication quality of the radio communication line through which the control information is transmitted is greater than or equal to a threshold. The path determination unit 1196 may acquire, from the acquisition unit 1192, communication area information indicating the area where the radio signals reach as the communication quality information, and determine the flight path in a direction of a position that is a communication area.

(Method of Determining Flight Path in Region which Radio Signals do not Reach)

Figure 3:
FIG. 3 is a diagram illustrating a process of determining a flight path in a direction of a position at which communication quality is greater than or equal to a threshold in the first embodiment.

FIG. 3 is a diagram illustrating a process of determining a flight path in a direction of a position at which communication quality is greater than or equal to a threshold in the first embodiment. In FIG. 3, it is assumed that a user flies the flying device 11 toward a destination A0 indicated by an open circle along a flight path FL1 indicated by an arrow using the control device that controls the flying device 11. In a case where the flying device 11 flies over a region B which radio signals of the mobile telephone network do not reach and is surrounded by a dotted line, and cannot receive the control information, the communication control unit 1191 of the flying device 11 notifies the path determination unit 1196 that it cannot receive the control information.

In a case where the path determination unit 1196 receives a notification that it cannot receive the control information from the communication control unit 1191, if a flight path is stored in the storage unit 118 in advance, the path determination unit 1196 notifies the flight control unit 1193 of the stored flight path. The flight control unit 1193 controls the flying mechanism 112 to fly along the flight path received in the notification from the flight control unit 1193. If no flight path is stored in the storage unit 118 in advance, the path determination unit 1196 determines a flight path that comes closest to a current in-flight position on the basis of the communication quality information, for example, toward a position at which strengths of the radio signals of the base station are high, and notifies the flight control unit 1193 of the determined flight path. If no flight path is stored in the storage unit 118 in advance, the path determination unit 1196 may determine a flight path that returns to a position at which the control information is received finally, and notify the flight control unit 1193 of the determined flight path.

The path determination unit 1196 determines a position A1 included in a region where radio signal strength is higher than or equal to a low level in FIG. 3 on the basis of the communication quality information which the acquisition unit 1192 acquires. The path determination unit 1196 determines a flight path to be a flight path FL2 toward the position A1. To be specific, the path determination unit 1196 determines a closest position from the current in-flight position, among positions corresponding to positional information included in a region where radio signal strength is higher than or equal to a low level in the communication quality information, as the position A1. Further, the path determination unit 1196 determines a straight line connecting the position A1 and the current in-flight position as the flight path FL2. The flight control unit 1193 flies the flying device 11 toward the position A1 along the flight path FL2. Thereby, even if the flying device 11 cannot receive the radio signals of the mobile telephone network, the flying device 11 can fly toward a position at which the radio signals of the mobile telephone network can be received.

The path determination unit 1196 may determine a flight path to be a flight path toward a position at which the control information can be received. Further, in a case where the path determination unit 1196 receives a notification that the control information cannot be received from the communication control unit 1191, the path determination unit 1196 may determine a flight path that returns a path along which the flying device 11 has flown on the basis of the position where the flying device 11 flew and is stored in the storage unit 118.

(Method of Determining Flight Path in Region which Radio Signals Reach)

Even when the flying device 11 is flying over a position at which it can receive the control information from the control device, the flying device 11 can fly along the flight path determined by the path determination unit 1196.

Figure 4:
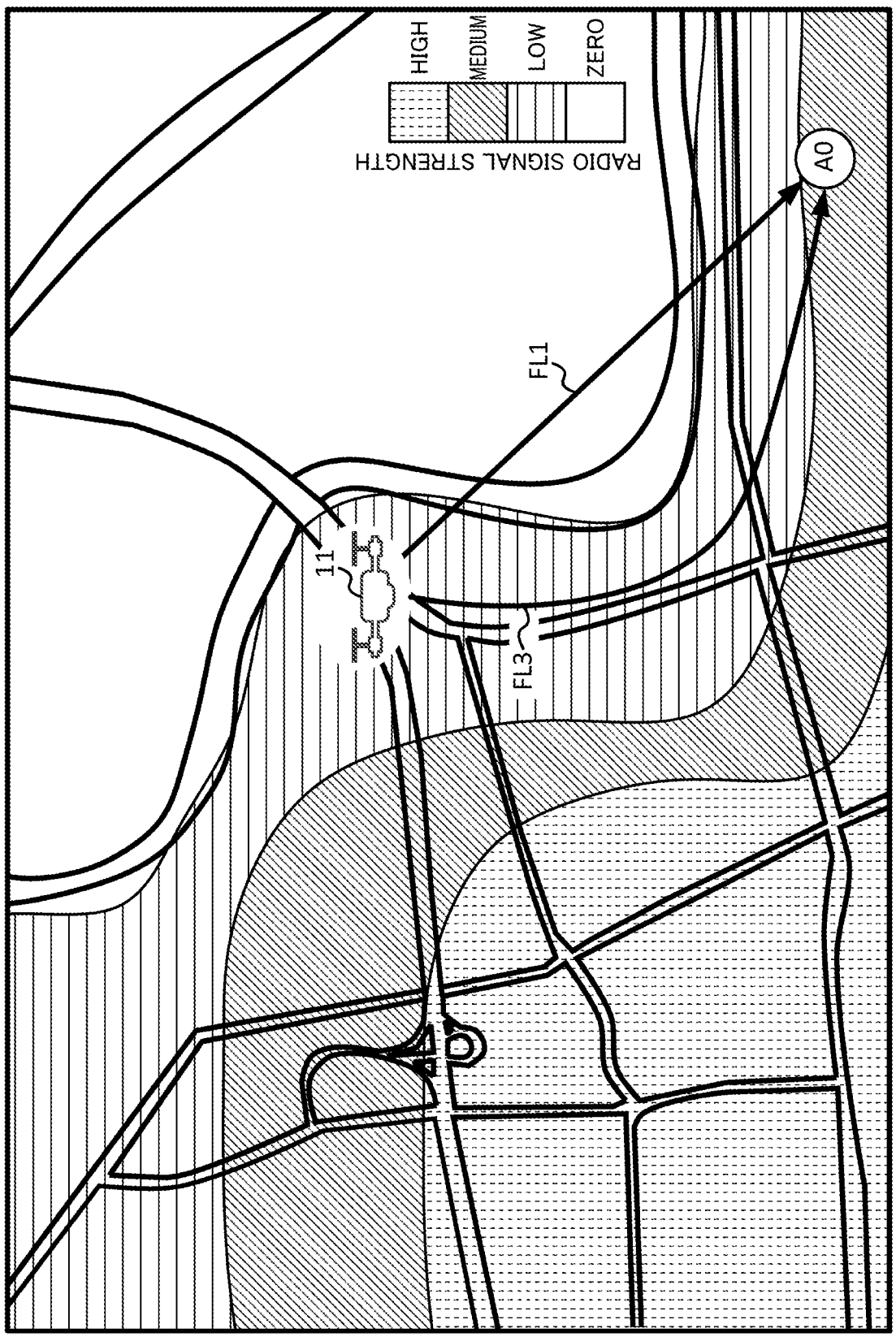
FIG. 4 is a diagram illustrating a process of determining a flight path in flight over a position at which communication quality is greater than or equal to a threshold in the first embodiment.

FIG. 4 is a diagram illustrating a process of determining a flight path in flight over a position at which communication quality is greater than or equal to a threshold in the first embodiment. To be specific, when the path determination unit 1196 receives control information including an instruction that determines a route from the control device which a user uses, the path determination unit 1196 determines a flight path toward a destination A0 instructed by a user from a position of its own device to be a flight path FL3 on the basis of the communication quality information. For example, when the path determination unit 1196 receives control information including an instruction that determines a route from a user, the path determination unit 1196 determines a flight path, which includes a position at which communication quality is greater than or equal to a threshold (e.g., a low level or more in FIG. 4) between an in-flight position and a destination A0 which the storage unit 118 stores, to be a flight path FL3.

The path determination unit 1196 may determine a shortest route which passes remaining positions excluding a position at which the strengths of the radio signals which the base station sends are zero (0) and which connects a current in-flight position and a destination in the communication quality information as the flight path FL3. The communication quality information is information with which positional information indicating a position and strength of the radio signals which the base station of the mobile telephone network at the position indicated by the positional information transmits are associated. The path determination unit 1196 can determine the shortest route using a known algorithm. Thereby, the flying device 11 can fly in a state in which a connection with the mobile telephone network is maintained.

The path determination unit 1196 may determine a shortest route, which passes a position at which communication quality is greater than or equal to a threshold among positions within a prescribed angle range centering on a direction of the destination, to be the flight path.

Figure 5:
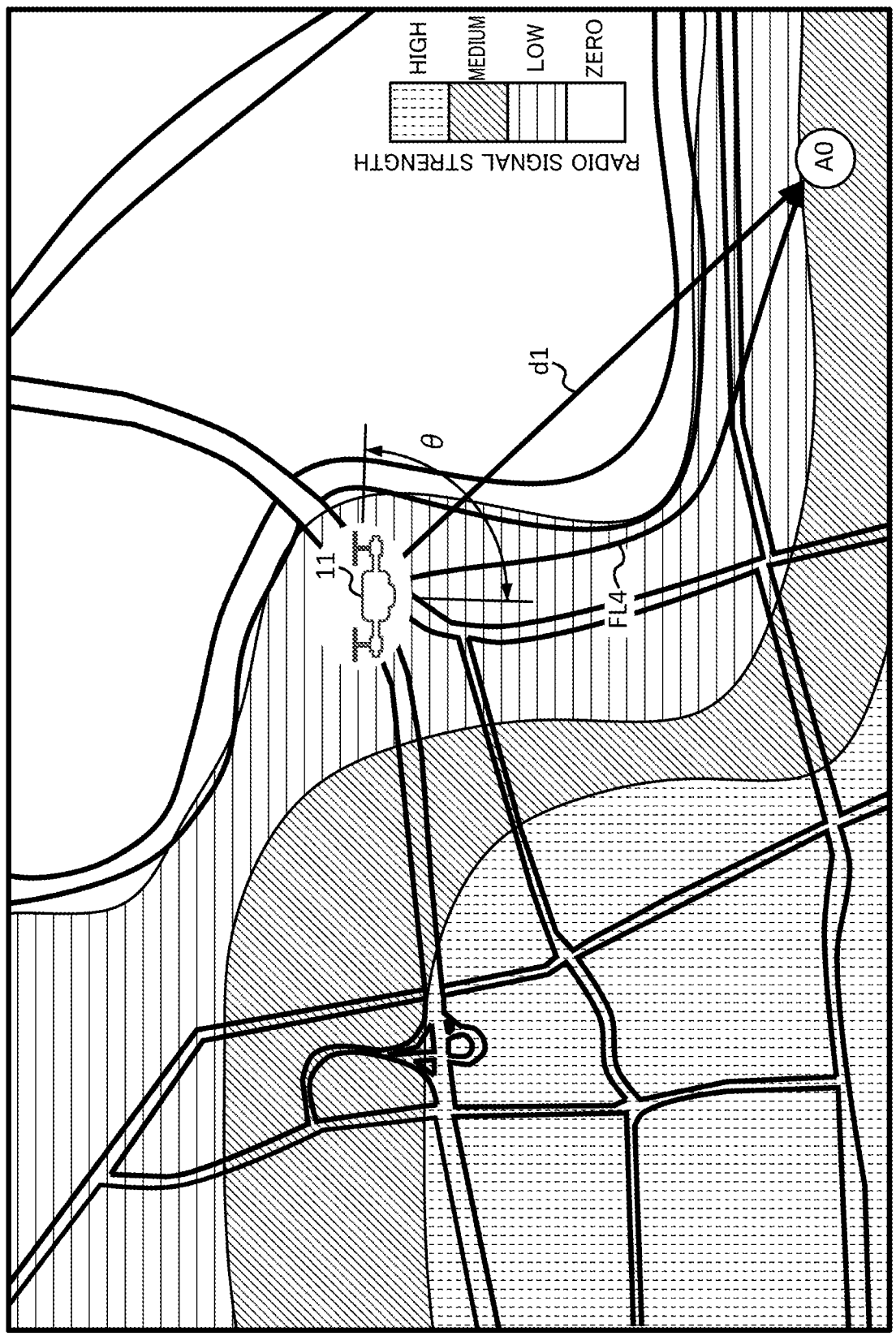
FIG. 5 is a diagram illustrating a process of determining a flight path toward a destination within a prescribed angle range in the first embodiment.

FIG. 5 is a diagram illustrating a process of determining a flight path toward a destination within a prescribed angle range in the first embodiment. The path determination unit 1196 determines a prescribed angle θ centering on a direction dl of a destination indicated by a linear arrow. The prescribed angle θ is, for example, 90 degrees. The path determination unit 1196 determines a flight path including a position at which radio signal strength is greater than or equal to a low level among positions within a range of the prescribed angle θ to be a flight path FL4. Thereby, the flying device 11 can fly in the state in which the connection with the mobile telephone network is maintained without greatly departing from a direction toward the destination.

The path determination unit 1196 may determine the flight path FL4 after excluding positions beyond the prescribed angle. To be specific, the path determination unit 1196 determines a shortest route which passes remaining positions excluding the positions beyond the prescribed angle range centering on the direction of the destination and which connects a current in-flight position and the destination as the flight path FL4.

The path determination unit 1196 may determine a shortest route, which passes a closest position in a direction of the destination among positions at which communication quality is greater than or equal to a threshold, to be the flight path FL4. To be specific, the path determination unit 1196 determines a position at which an angle θ with respect to the direction of the destination is minimized among the positions at which the communication quality included in the communication quality information is greater than or equal to the threshold as a passage position. Further, the path determination unit 1196 determines a shortest route, which connects the current in-flight position and the passage position, as the flight path FL4.

(Method of Determining Flight Path Based on Ambient Environment)

The path determination unit 1196 may determine a flight path further on the basis of an ambient environment identified by the environment identification unit 114. To be specific, first, the communication control unit 1191 of the flying device 11 transmits the ambient environment which the environment identification unit 114 identifies to a management server. The management server generates ambient environment information on the basis of ambient environments which are acquired from the communication control units 1191 of a plurality of flying devices 11 and are identified by the environment identification units 114 of the plurality of flying devices 11. The management server transmits the ambient environment information to the communication control unit 1191 of the flying device 11. The communication control unit 1191 of the flying device 11 acquires the ambient environment information from the management server. The path determination unit 1196 determines a flight path that includes a position at which the ambient environment indicated by the ambient environment information meets a prescribed condition among positions at which communication quality is greater than or equal to a threshold. The prescribed condition is, for example, that a wind speed is smaller than or equal to a prescribed value, that a wind direction is toward the destination, and that an amount of rainfall is smaller than or equal to a prescribed value.

(Method of Determining Flight Path Based on Changing Situation of Communication Quality)

The path determination unit 1196 determines a flight path on the basis of a changing situation of communication quality. For example, the path determination unit 1196 changes a frequency with which it determines the flight path on the basis of a degree of change in the communication quality.

Figure 6:
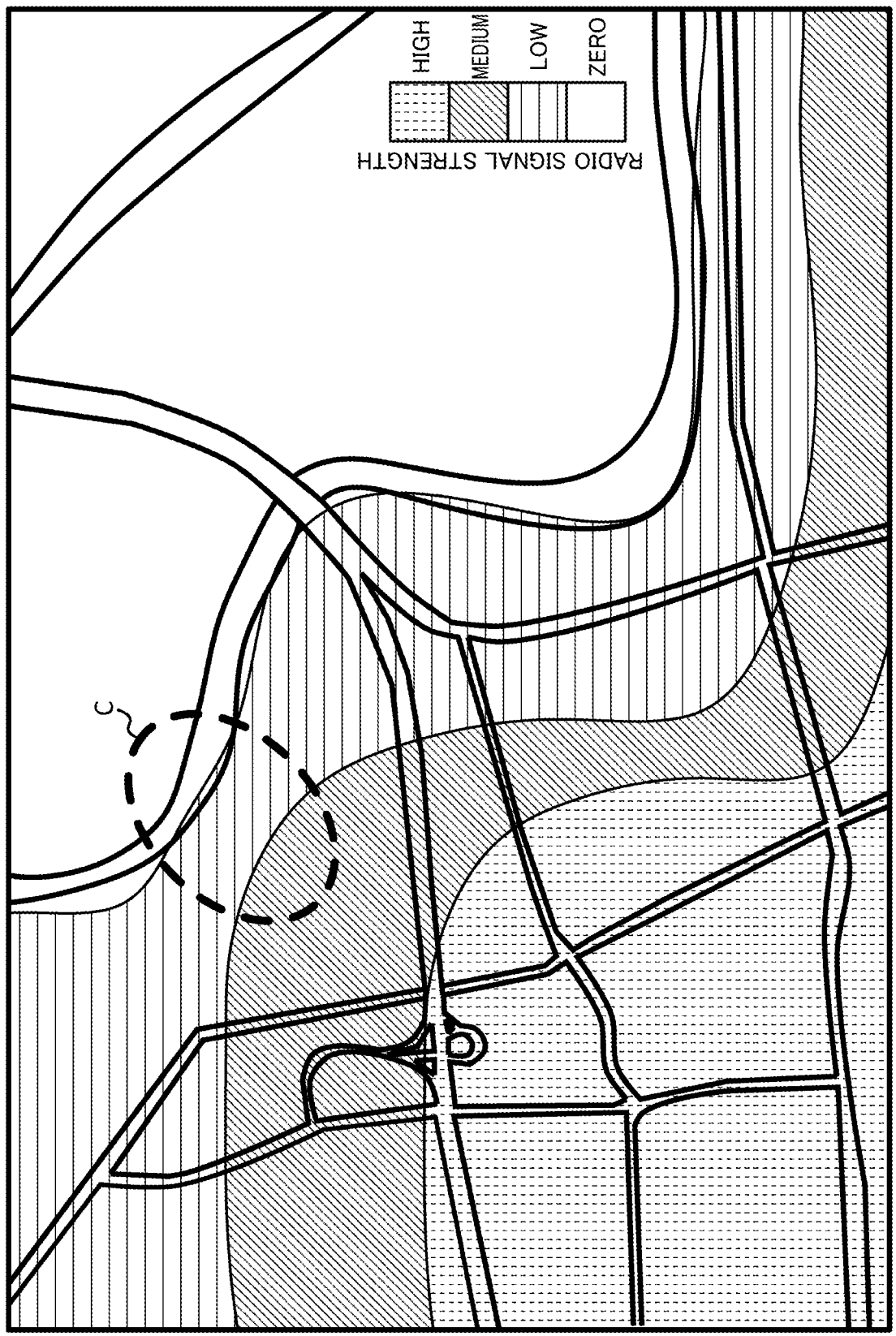
FIG. 6 is a diagram illustrating a degree of change in radio signal strength in the first embodiment.

FIG. 6 is a diagram illustrating a degree of change in radio signal strength in the first embodiment. A region surrounded by a broken line C in FIG. 6 undergoes a sharp change in the radio signal strength of the mobile telephone network. At a position at which a change in this radio signal strength is sharp, the flying device may suddenly reach the position which radio signals of the mobile telephone network do not reach. For this reason, the path determination unit 1196 increases the frequency with which it determines the flight path at the position at which the change in the radio signal strength is sharp. Thereby, it is possible to prevent the flying device 11 from being unable to receive the radio signals of the mobile telephone network.

The path determination unit 1196 may change the frequency with which it determines the flight path on the basis of a frequency of update in communication quality information in the management server. The management server receives communication quality from a plurality of flying devices 11, and changes the communication quality information on the basis of the received communication quality. When a change in communication quality information occurs, the management server transmits the changed communication quality information to the flying device 11.

The acquisition unit 1192 acquires communication quality information which the management server changes from the management server. When the acquisition unit 1192 acquires the changed communication quality information from the management server, the path determination unit 1196 of the flying device 11 determines a flight path. In a case where a frequency with which the acquisition unit 1192 acquires the communication quality information is high, the path determination unit 1196 increases the frequency with which it determines the flight path. Thereby, in a case where the radio signal strength varies in a short period, it is possible to prevent the flying device 11 from being unable to receive the radio signals of the mobile telephone network.

[Transmission of Warning Information of Unreceivable Radio Signals]

The path determination unit 1196 may identify an unreceivable area that is a position at which there is a possibility that the radio signals of the mobile telephone network cannot be received on the basis of the communication quality information which the acquisition unit 1192 acquires. The path determination unit 1196 may transmit, to a control device for controlling its own device, warning information indicating that the unreceivable area is near while flying within a prescribed range from the unreceivable area. Furthermore, when the path determination unit 1196 detects that an incommunicable area is included in a flight path that is included in control information including an instruction that determines a route from a user, the path determination unit 1196 may transmit the warning information to the control device.

When the control device for controlling the flying device 11 receives the warning information, the control device displays the warning information. For example, the control device displays the warning information over prestored communication quality information. To be specific, the control device displays a position at which the radio signals of the base station cannot be received and which is indicated in the warning information over a map that indicates a communicable area included in the communication quality information. The control device may display the warning information as text information.

Further, information that indicates an area where is previously measured and which radio signals sent by the base station of the mobile telephone network reach is included in the map that indicates the communicable area, and the control device displays the area where the radio signals reach in a different color from other areas. For example, in a case where the control device receives information indicating that any base station stops transmission of radio signals from a server for managing the base station, the control device may change an area where the transmission of the radio signals is stopped to a different color from the area where the radio signals reach.

Thereby, since a user who uses the control device can know a region which the radio signals of the base station may not reach, the user can control the flying device 11 while avoiding an incommunicable position.

The control device for controlling the flying device 11 may display the warning information as well as a region which the radio signals of the mobile telephone network reach. For example, the control device acquires radio signal strength information, which is generated on the basis of intensity of radio signals which the management server acquires from another flying device 11 and which the base station transmits, from the management server, and displays the area where the radio signals transmitted by the base station reach on the basis of the radio signal strength information. To be specific, the control device displays a color superimposed the area where the radio signals transmitted by the base station reach, on the map that indicates the communicable area.

Hereinafter, an operation when the flying device 11 cannot receive the control information will be described in detail using FIG. 7.

[Return Operation of Flying Device 11]

Figure 7:
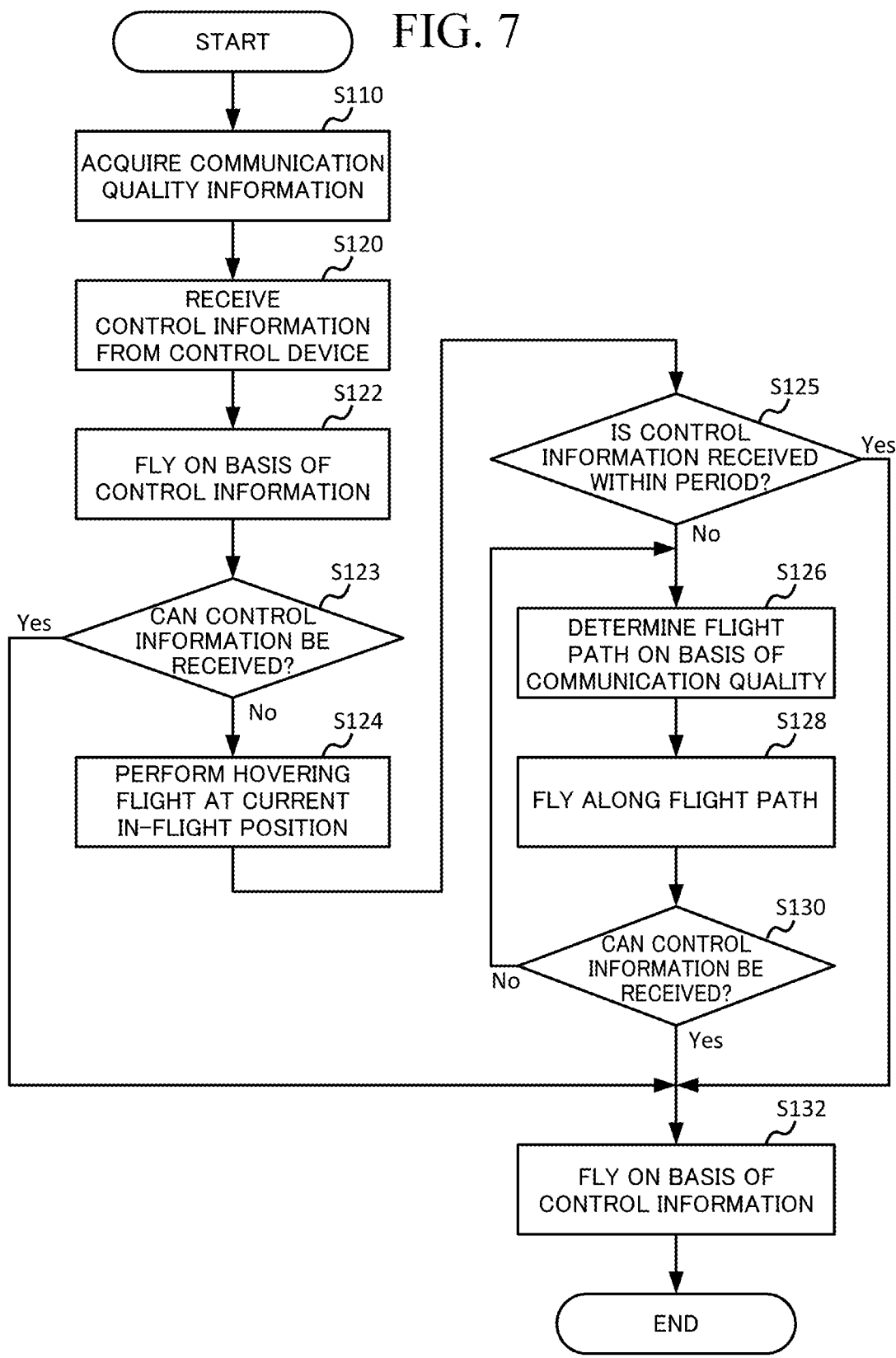
FIG. 7 is a flow chart for a return operation of the flying device in the first embodiment.

FIG. 7 is a flow chart for a return operation of the flying device 11 in the first embodiment. The return operation is an operation of making a flight up to a position at which the flying device 11 can receive control information when the flying device 11 cannot receive the control information. In the flow chart of FIG. 7, it is assumed that a user who uses the control device for controlling the flying device 11 controls the flying device 11. First, the flying device 11 acquires communication quality information from the management server (S110). The flying device 11 receives control information from the control device (S120). Next, the flying device 11 flies on the basis of the control information (S122).

The flying device 11 appropriately determines whether or not it can receive the control information (S123). In a case where the flying device 11 receives the control information (Yes at S123), the flying device 11 flies on the basis of the control information (S132). In a case where the flying device 11 cannot receive the control information (No at S123), the flying device 11 performs a hovering flight at a current in-flight position (S124). The flying device 11 determines whether it receives the control information within a prescribed period (S125). When the flying device 11 receives the control information within the prescribed period (Yes at S125), the flying device 11 flies on the basis of the control information (S132).

When the flying device 11 cannot receive the control information within the prescribed period (No at S125), the flying device 11 determines a flight path on the basis of the communication quality information which the acquisition unit 1192 previously acquires (S126). The path determination unit 1196 determines the flight path, for example, in a direction of a position at which radio signal strength is greater than or equal to a threshold. The flying device 11 flies along the determined flight path (S128). The flying device 11 determines whether it can receive the control information (S130). In a case where the flying device 11 cannot receive the control information (No at S130), the flying device 11 returns to S126, and determines the flight path again. In a case where the flying device 11 can receive the control information (Yes at S130), the flying device 11 flies on the basis of the control information (S132).

[Effects of Flying Device 11]

As described above, in the case where the flying device 11 cannot receive the control information from the control device for controlling the flying device 11, the flying device 11 moves to a position at which it can receive the control information on the basis of the communication quality information. Thereby, even if communication between the control device and the flying device 11 is interrupted, a user who controls the flying device 11 can control the flying device 11 after the flying device 11 flies to a position at which it can receive the radio signals of the mobile telephone network.

Outline of Second Embodiment

Figure 8:
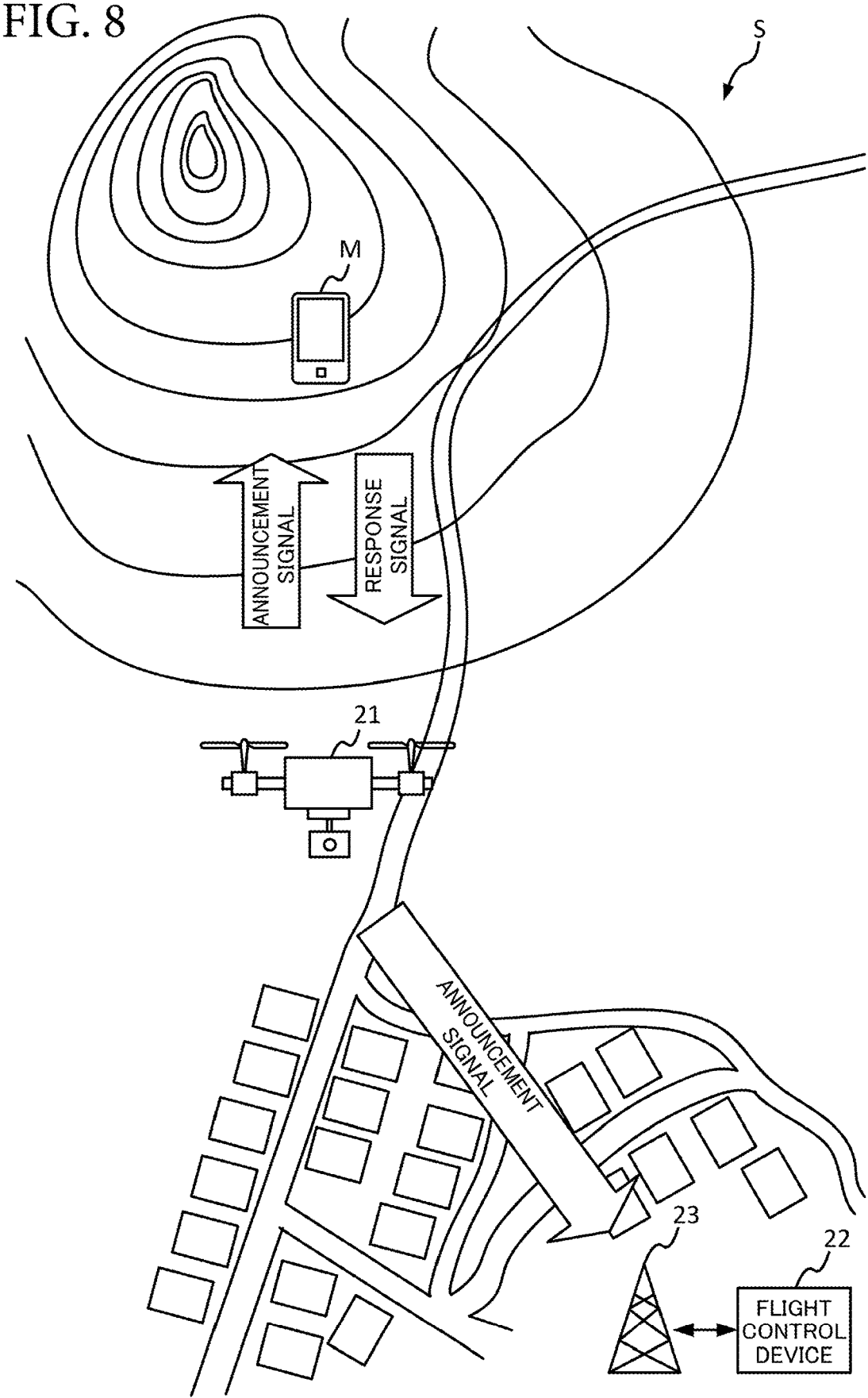
FIG. 8 is a diagram illustrating a constitution of a position identification system S in a second embodiment.

FIG. 8 is a diagram illustrating a constitution of a position identification system S in a second embodiment. The position identification system S is a position identification system that identifies a position of a portable terminal M owned by a person in distress. For example, the position identification system S is used for a search party that makes a search for a person in distress at a place which radio signals of a base station 23 do not reach.

The position identification system S has a flying device 21, a flight control device 22, a base station 23 of a mobile telephone network, and a portable terminal M. The flying device 21 is a flying device that flies on the basis of flight path information indicating a flight path, for example a drone. The flight control device 22 is a control device which a search party uses and which transmits flight information that indicates a flight path to the flying device 21. The flight control device 22 is, for example, a desktop PC, a tablet, or a smartphone. The base station 23 of the mobile telephone network transmits an announcement signal to the portable terminal M, and receives a response signal from the portable terminal M. The mobile telephone network is, for example, an LTE network. The portable terminal M is a portable terminal owned by a person in distress, and is, for example, a portable phone, or smartphone.

The search party operates the flight control device 22, and sets a flight path so as to fly around a place where a person in distress having the portable terminal M seems to have suffered. The flight control device 22 transmits flight path information indicating the flight path and area information indicating an area where radio signals of the base station 23 do not reach to the flying device 21. When the flying device 21 acquires the flight path information, the flying device 21 starts a flight. The flying device 21 flies along the flight path, and transmits an announcement signal in a constant interval or at a preset timing when being in flight around a place which the radio signals of the base station 23 do not reach. The announcement signal transmitted by the flying device 21 is a signal based on the same communication protocol as an announcement signal transmitted by the base station 23.

When the portable terminal M owned by the person in distress receives the announcement signal transmitted by the flying device 21, the portable terminal M transmits a response signal to the flying device 21. When the flying device 21 receives the response signal transmitted by the portable terminal M, the flying device 21 acquires a position thereof at the time of reception. The flying device 21 transmits announcement information including the position thereof acquired when the response signal is received from the portable terminal M to the flight control device 22 when being in flight around a place which the radio signals of the base station 23 reaches. The flight control device 22 causes a display device to display the received announcement information. The search party identifies an area where an existence possibility of the portable terminal M is high on the basis of the announcement information displayed on the display device, and makes a search for a person in distress.

Hereinafter, constitutions of the flying device 21 and the flight control device 22 will be described in detail.

[Constitution of Flying Device 21]

Figure 9:
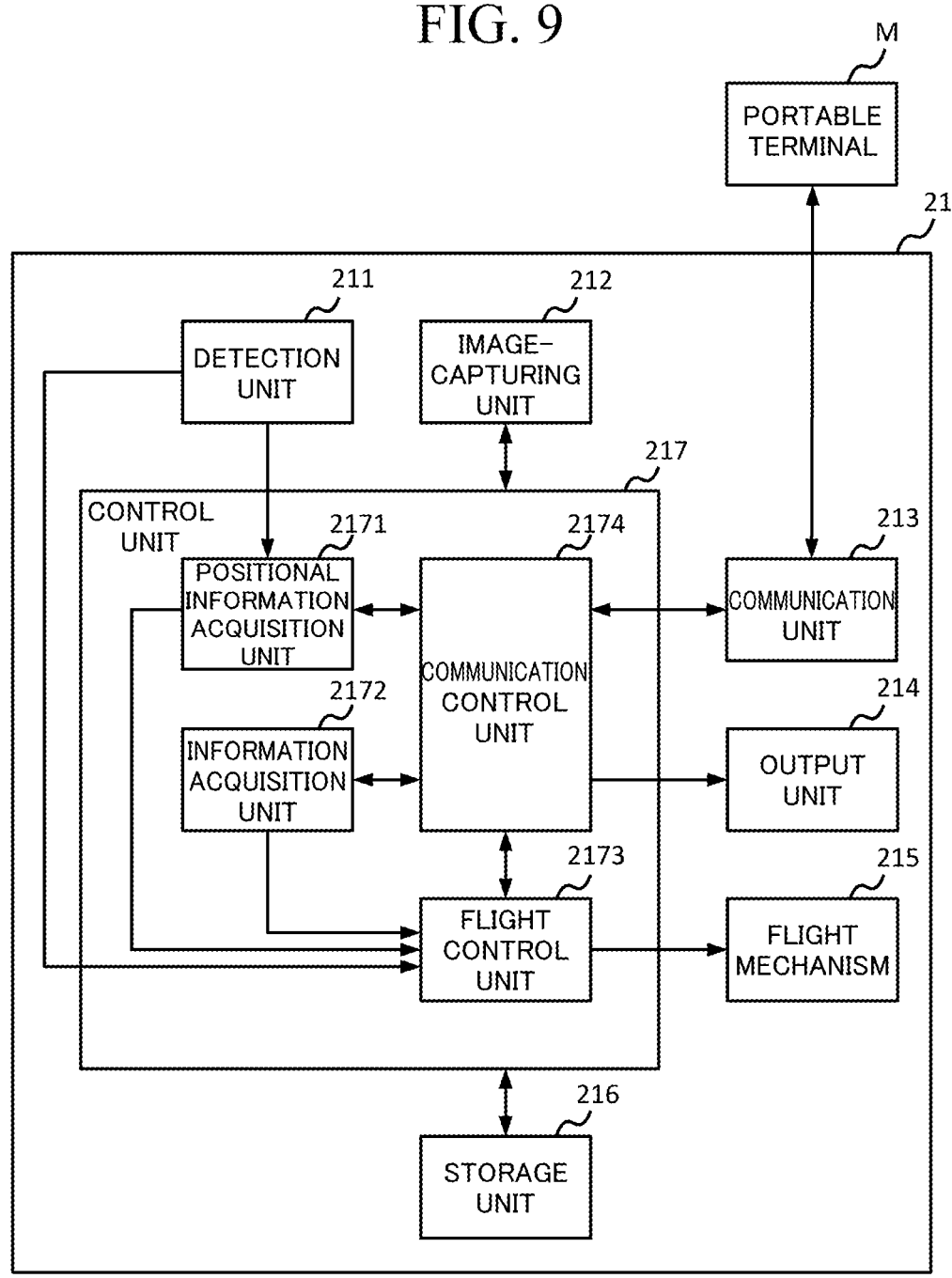
FIG. 9 is a diagram illustrating a constitution of a flying device in the second embodiment.

FIG. 9 is a diagram illustrating a constitution of the flying device 21 in the second embodiment. The flying device 21 has a detection unit 211, an image-capturing unit 212, a communication unit 213, an output unit 214, a flying mechanism 215, a storage unit 216, and a control unit 217. The control unit 217 has a positional information acquisition unit 2171, an information acquisition unit 2172, a flight control unit 2173, and a communication control unit 2174.

The detection unit 211 includes, for example, an altimeter, an acceleration sensor, and a global positioning system (GPS) receiver, and outputs information for identifying a state of the flying device 21, such as a flying altitude, a flying speed, an inclination, and a flight position of the flying device 21, to the flight control unit 2173. Further, the detection unit 211 notifies the positional information acquisition unit 2171 of detected flight position. The image-capturing unit 212 captures surroundings of the flight position of the flying device 21, and generates captured image data. The image-capturing unit 212 outputs the generated captured image data to the control unit 217.

The communication unit 213 is a communication module that transmits/receives radio signals for performing communication using an LTE network. The communication unit 213 has a modulator that modulates transmission data input from the communication control unit 2174, and a high-frequency unit that transmits data after the modulation as a high-frequency signal of a frequency band allocated to LTE. Further, the communication unit 213 has a demodulator that demodulates a high-frequency signal which the high-frequency unit receives from the flying device 21. The demodulator inputs reception data after the demodulation to the communication control unit 2174. Further, the communication unit 213 has the same function as the base station 23 of the mobile telephone network.

The output unit 214 is a communication module that transmits/receives radio signals for performing communication using a radio communication line. The radio communication line is, for example, an LTE network, Wi-Fi (a registered trademark), or Bluetooth (a registered trademark). The output unit 214 receives announcement information which the communication control unit 2174 generates, and outputs the announcement information to a previously registered output destination. In a case where the communication control unit 2174 receives a response signal, the output unit 214 outputs announcement information indicating that it receives the response signal. Further, the output unit 214 may output the announcement information to the previously registered output destination via another flying device 21.

The flying mechanism 215 includes a propeller, a motor that rotates the propeller, and a rudder. The flying mechanism 215 operates mechanisms of these on the basis of control of the flight control unit 2173, and thereby can change a flying altitude, a flying speed, and a flying direction.

The storage unit 216 is a storage medium that includes a read only memory (ROM) and a random access memory (RAM). The storage unit 216 stores a program which the control unit 217 executes. Further, the storage unit 216 is used as a work memory of the control unit 217, and temporarily stores, for example, flight path information and area information that are received from the flight control device 22, and positional information which the positional information acquisition unit 2171 acquires.

The control unit 217 is, for example, a central processing unit (CPU). The control unit 217 executes the program stored in the storage unit 216, and thereby functions as the positional information acquisition unit 2171, the information acquisition unit 2172, the communication control unit 2174, and the flight control unit 2173.

The positional information acquisition unit 2171 controls the detection unit 211 to acquire positional information that indicates a flight position. Further, the positional information acquisition unit 2171 transmits, to the communication control unit 2174 or the flight control unit 2173, the positional information that indicates the acquired flight position.

The information acquisition unit 2172 acquires area information which the communication control unit 2174 receives and which indicates an area where the radio signals of the base station 23 of the mobile telephone network do not reach. For example, the information acquisition unit 2172 acquires, as the area information that indicates the area where no radio signals reach, area information that includes information for identifying an area where no radio signals reach or area information that includes information for identifying an area where the radio signals reach. The information acquisition unit 2172 can further acquire flight path information, received by the communication control unit 2174, which indicates a flight path within the area indicated by the area information. The information acquisition unit 2172 notifies the flight control unit 2173 of the acquired flight path information. The information acquisition unit 2172 can acquire area information that includes radio signal state information that indicates intensity distribution of the radio signals of the base station 23.

Figure 10:
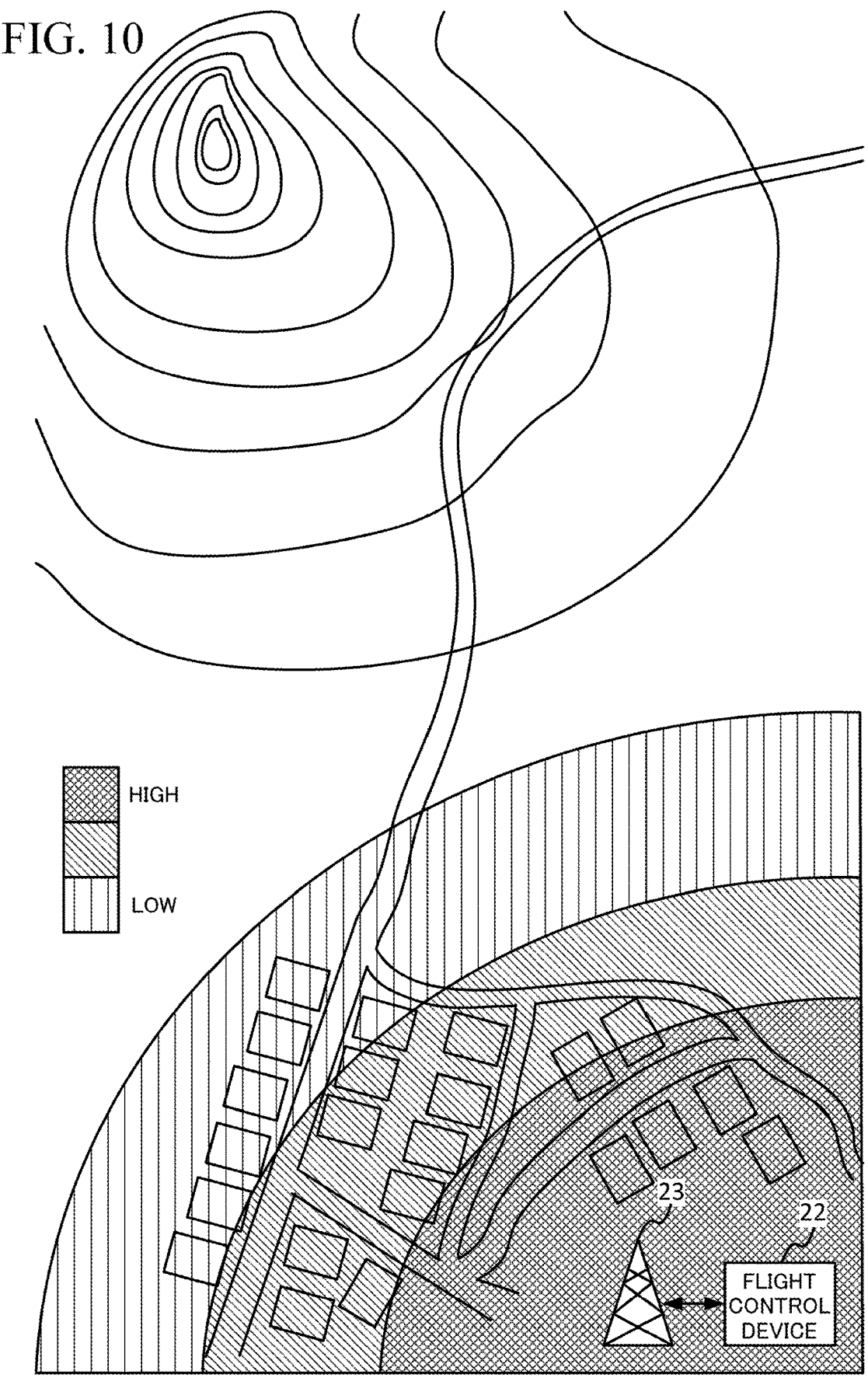
FIG. 10 is a diagram illustrating area information that includes radio signal state information in the second embodiment.

FIG. 10 is a diagram illustrating area information that includes radio signal state information in the second embodiment. The base station 23 located at a right lower portion of FIG. 10 is a base station of a mobile telephone network installed in an urban district, and transmits a base station signal to be announced to the portable terminal M.

A portion filled with a rhombic shape in FIG. 10 indicates a place where a distance from the base station 23 is short and radio signal strength of the base station signal is high. A portion filled with an oblique line in FIG. 10 indicates a place where the distance from the base station 23 is medium and the radio signal strength of the base station signal is medium. A portion filled with a longitudinal line in FIG. 10 indicates a place where the distance from the base station 23 is relatively long and the radio signal strength of the base station signal is low. An unfilled portion in FIG. 10 indicates an area in which the distance from the base station 23 of the mobile telephone network is long and which radio signals of the base station signal do not reach. The information acquisition unit 2172 acquires area information that includes radio signal state information that indicates intensity distribution of the radio signals of the base station signals announced by the base station 23 as described above.

The area information that indicates the area where radio signals do not reach may differ at each height from the ground. To be specific, for example, an area where radio signals of the base station signals do not reach at a height of 10 m from the ground and an area where radio signals of the base station signals do not reach at a height of 20 m from the ground may be different. The information acquisition unit 2172 of the flying device 21 may acquire an area where radio signals of the base station signals do not reach at a height from the ground recommended such that its own device flies, on the basis of machine information of its own device. Further, like the area information that indicates the area where radio signals do not reach, area information that indicates the area where radio signals reach may differ at each height from the ground.

The flight control unit 2173 controls the flying mechanism to make a flight within a prescribed distance range to the ground on the basis of map data including height information. Further, the flight control unit 2173 acquires flight path information which the communication control unit 2174 receives and which indicates a flight path, or flight path information stored in the storage unit 216. The flight control unit 2173 controls the flying mechanism 215 to make a flight along the flight path indicated by the flight path information on the basis of the positional information acquired by the positional information acquisition unit 2171.

The flight control unit 2173 can appropriately change a flight path. The flight control unit 2173 changes a flight path, for example, on the basis of a remaining battery level of its own device, and a wind direction, a wind speed, and an amount of rainfall at a flight position. Further, the flight control unit 2173 changes a flight path on the basis of weather forecast information which the communication control unit 2174 acquires.

When the flight control unit 2173 receives a response signal from the portable terminal M in response to an announcement signal transmitted by the communication control unit 2174 (to be described below), the flight control unit 2173 changes a flight path on the basis of the radio signal state information. To be specific, when the communication control unit 2174 receives the response signal, the flight control unit 2173 sets a flight path to be directed to the area where the radio signals of the base station 23 reach and where is nearest from a current position included in the area where the radio signals of the base station 23 do not reach, on the basis of the radio signal state information. The flight control unit 2173 controls the flying mechanism to make a flight along the changed flight path. Thereby, the flying device 21 can rapidly fly over the area where the radio signals of the base station 23 reach when receiving the response signal from the portable terminal M.

The communication control unit 2174 detects entrance into the area where the radio signals of the base station 23 do not reach on the basis of the positional information acquired by the positional information acquisition unit 2171 and the radio signal state information. To be specific, in a case where the positional information indicating a flight position is included in a place where strengths of the radio signals of the base station 23 indicated by the radio signal state information are smaller than or equal to a prescribed value, the communication control unit 2174 detects entrance into the area where the radio signals of the base station 23 do not reach. The communication control unit 2174 detects the strengths of the radio signals of the base station 23, and transmits an announcement signal under condition that the strengths of the radio signals of the base station 23 are smaller than or equal to a prescribed threshold. In this way, the communication control unit 2174 of the flying device 21 transmits an announcement signal on the basis of a value obtained by measuring the radio signals of the base station 23, and thus can transmit the announcement signal without interfering with the existing mobile telephone network.

For example, the communication control unit 2174 transmits an announcement signal that includes identification information about the portable terminal M that is a search target stored in the storage unit 216. The portable terminal M receives the announcement signal which the communication control unit 2174 of the flying device 21 transmits and which includes the identification information. The portable terminal M transmits a response signal when the identification information included in the received announcement signal and identification information about its own device are coincident with each other.

In a case where the flight position indicated by the positional information is within the area, indicated by the area information, where the radio signals of the base station 23 do not reach, the communication control unit 2174 transmits an announcement signal which the portable terminal M can receive, and receives a response signal to the announcement signal. When the communication control unit 2174 receives a response signal coincident with the identification information about the portable terminal M that is a search target, the communication control unit 2174 may transmit a predetermined message to the portable terminal M that is a search target. The communication control unit 2174 transmits announcement information indicating that it receives the response signal to the output unit 214. In a case where the response signal which the communication control unit 2174 receives includes the identification information about the portable terminal M that is a search target, the output unit 214 outputs the announcement information.

The communication control unit 2174 transmits announcement information, which includes positional information indicating a flight position at a point in time when it receives a response signal which the positional information acquisition unit 2171 acquires, to the output unit 214. The output unit 214 outputs announcement information, which includes positional information at a point in time when it receives the response signal from the portable terminal M. Further, the communication control unit 2174 may transmit announcement information, which includes radio signal strength of the acquired response signal, to the output unit 214. The output unit 214 may output announcement information that includes radio signal strength of the response signal at a point in time when it receives the response signal from the portable terminal M.

The communication control unit 2174 may acquire the positional information which the portable terminal M acquires by performing communication with the portable terminal M. To be specific, the communication control unit 2174 of the flying device 21 transmits an acquisition request to an application that is mounted in the portable terminal M, in order to cause the portable terminal M to transmit the positional information acquired by the portable terminal M. A control unit of the portable terminal M acquires the positional information about the portable terminal M, and transmits the positional information about the portable terminal M to the communication control unit 2174 of the flying device 21. The communication control unit 2174 transmits announcement information, which includes the positional information about the portable terminal M, to the output unit 214. Further, the communication control unit 2174 may acquire radio signal strength information that includes radio signal strength of the announcement signal which the portable terminal M receives by performing communication with the portable terminal M. To be specific, the control unit of the portable terminal M detects the radio signal strength of the announcement signal which the portable terminal M receives, and transmits the radio signal strength information that includes the radio signal strength of the announcement signal to the communication control unit 2174 of the flying device 21. The communication control unit 2174 transmits announcement information, which includes the radio signal strength information received from the portable terminal M, to the output unit 214.

The communication control unit 2174 detects strengths of the radio signals of the base station 23. The communication control unit 2174 determines whether or not the strengths of the radio signals of the base station 23 are greater than or equal to a prescribed value. If the strengths of the radio signals of the base station 23 are greater than or equal to the prescribed value, the communication control unit 2174 notifies the output unit 214 of the announcement information, and notifies that the strengths of the radio signals are greater than or equal to the prescribed value. The output unit 214 transmits the announcement information to the base station 23 at a position at which the strengths of the radio signals of the base station 23 are greater than or equal to the prescribed value, and thereby transmits the announcement information to a prescribed transmission destination. The prescribed transmission destination is, for example, a PC of a rescue center.

[Constitution Diagram of Flight Control Device 22]

Figure 11:
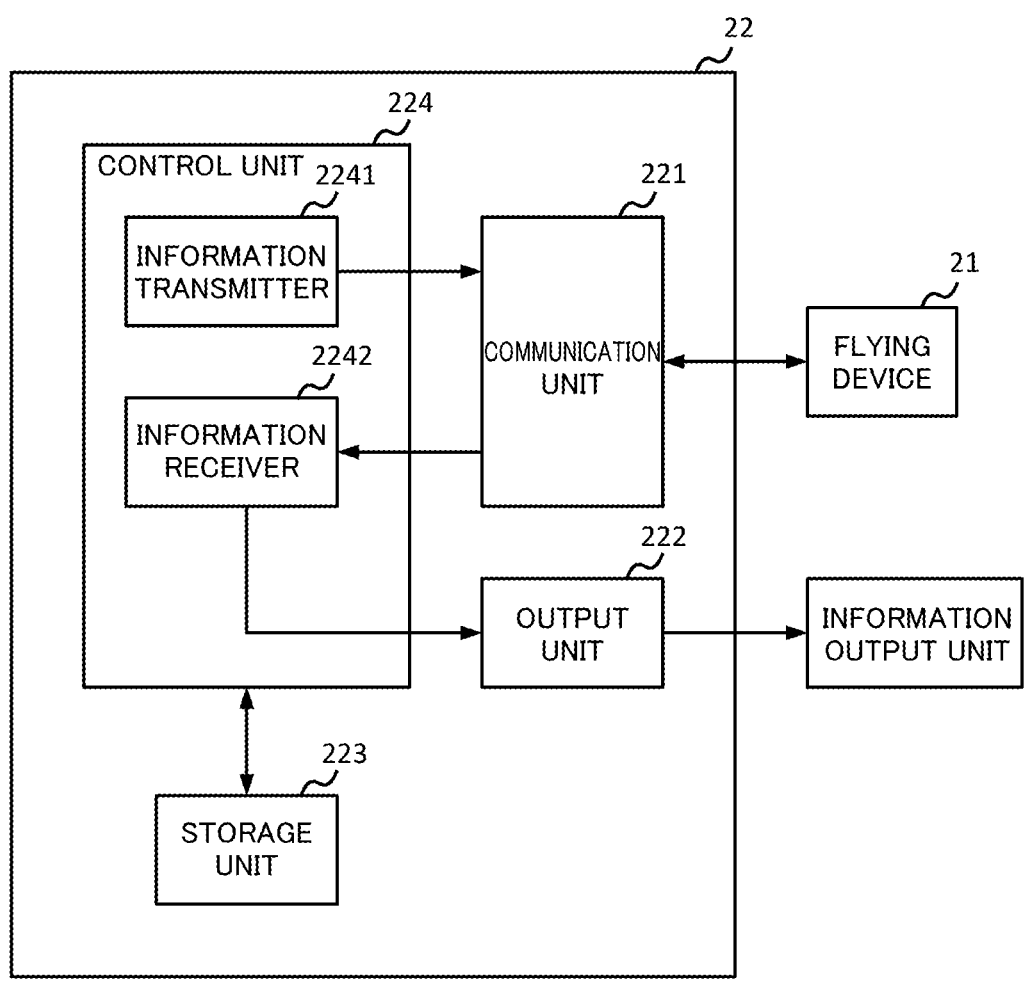
FIG. 11 is a diagram illustrating a constitution of a flight control device in the second embodiment.

FIG. 11 is a diagram illustrating a constitution of the flight control device 22 in the second embodiment. The flight control device 22 has a communication unit 221, an output unit 222, a storage unit 223, and a control unit 224. The control unit 224 has an information transmitter 2241 and an information receiver 2242.

The communication unit 221 is a communication interface connected to Network, and includes, for example, a local area network (LAN) controller. Further, the communication unit 221 may include a communication module that transmits/receives radio signals for performing communication using a radio communication line. The radio communication line is, for example, an LTE network or Wi-Fi. The communication unit 221 transmits/receives information to/from the flying device 21 via Network.

The output unit 222 outputs announcement information which the information receiver 2242 receives. The output unit 222 outputs the announcement information, for example, as image data for display on a display device that displays an image. Further, output unit 222 outputs the announcement information, for example, as text data. The output unit 222 outputs the announcement information to an information output device including, for example, a desktop PC, a tablet PC, or a smartphone. Further, the flight control device 22 may include a display unit, and the output unit 222 may cause the display unit to display the announcement information.

The storage unit 223 is a storage medium that includes a ROM and a RAM. The storage unit 223 stores a program which the control unit 224 executes. Further, the storage unit 223 is used as a work memory of the control unit 224, and temporarily stores, for example, area information, flight path information that includes a flight path of the flying device 21, and announcement information that is received from the flying device 21.

The control unit 224 is, for example, a CPU. The control unit 224 executes the program stored in the storage unit 223, and thereby functions as the information transmitter 2241 and the information receiver 2242. The information transmitter 2241 transmits flight path information, which indicates the flight path within the area where the radio signals of the base station 23 of the mobile telephone network do not reach, to the flying device 21. Further, the information transmitter 2241 transmits different pieces of flight path information to a plurality of flying devices 21. The information receiver 2242 receives announcement information indicating reception of a response signal from the portable terminal M in response to an announcement signal transmitted by the flying device 21 while flying over the area where the radio signals of the base station 23 do not reach. Further, the information receiver 2242 receives a plurality of pieces of announcement information from the plurality of flying devices.

The information receiver 2242 notifies the output unit 222 of the received announcement information.

[Operation of Flying Device 21]

Figure 12:
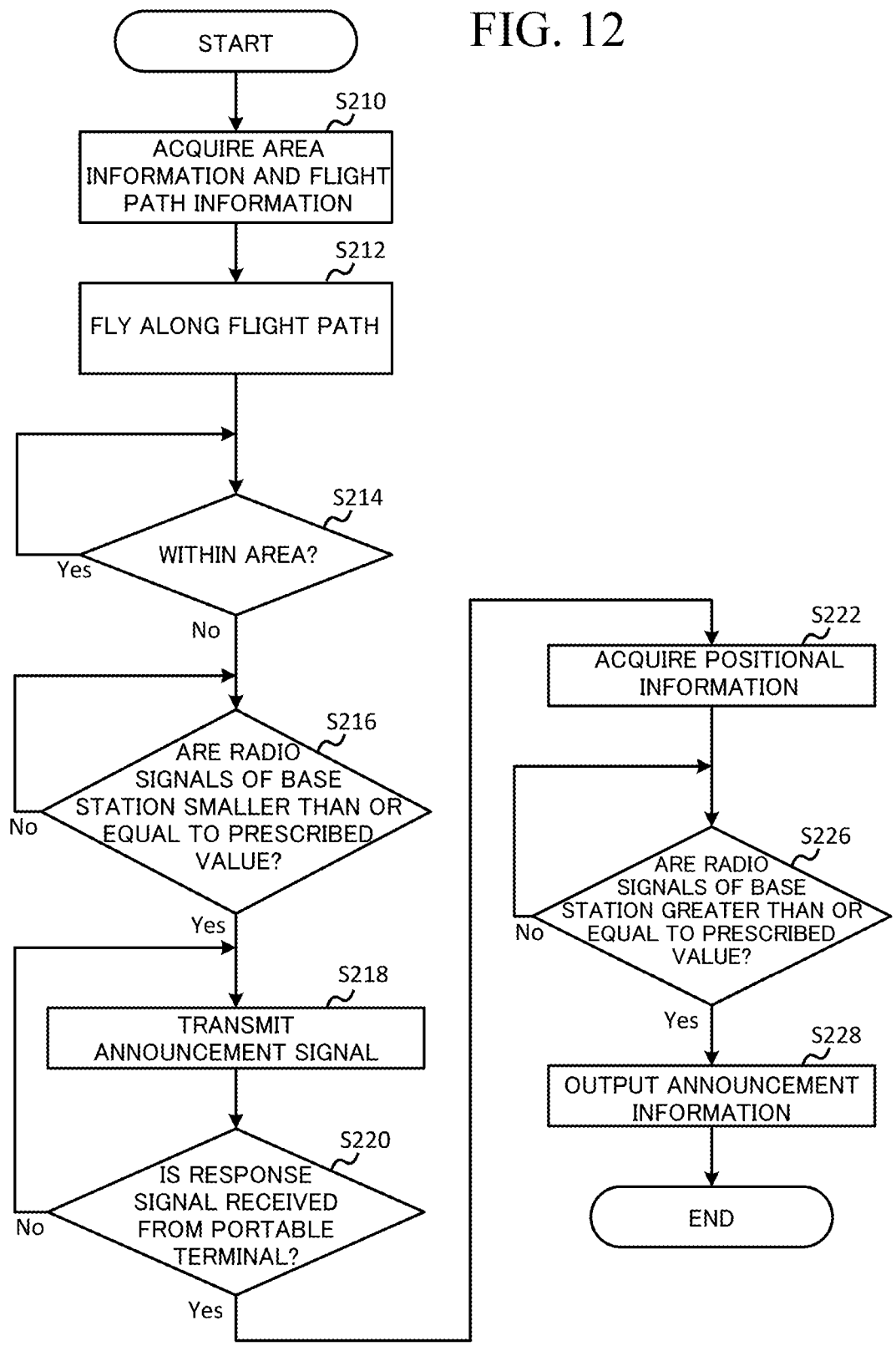
FIG. 12 is a flow chart illustrating an operation of the flying device in the second embodiment.

FIG. 12 is a flow chart illustrating an operation of the flying device 21 in the second embodiment. First, the information acquisition unit 2172 of the flying device 21 acquires area information and flight path information (S210). Next, the flight control unit 2173 starts a flight, on the basis of map data including height information and a flying altitude detected by the detection unit 211, such that a distance from the ground is within a prescribed range. The flight control unit 2173 controls the flying mechanism, on the basis of the positional information acquired by the positional information acquisition unit 2171, to make a flight along the flight path indicated by the flight path information (S212). Hereinafter, unless otherwise mentioned, the flight control unit 2173 of the flying device 21 controls the flying mechanism to make a flight along the flight path.

The communication control unit 2174 determines whether the flying device enters the area where the radio signals of the base station 23 do not reach on the basis of the positional information and the area information (S214). In a case where the flying device enters the area where the radio signals of the base station 23 do not reach (Yes at S214), the communication control unit 2174 detects strengths of the radio signals of the base station 23, and determines whether the strengths of the radio signals are smaller than or equal to a prescribed threshold (S216). If the strengths of the radio signals of the base station 23 are smaller than or equal to the prescribed threshold (Yes at S216), the communication control unit 2174 transmits an announcement signal (S218).

The communication control unit 2174 of the flying device 21 determines whether or not it receives a response signal from the portable terminal M (S220). When the communication control unit 2174 receives the response signal from the portable terminal M (Yes at S220), the positional information acquisition unit 2171 acquires positional information that indicates a flight position when the response signal is acquired (S222). The communication control unit 2174 detects the strengths of the radio signals of the base station 23, and determines whether strengths of the radio signals are greater than or equal to a prescribed threshold (S226). If the strengths of the radio signals of the base station 23 are smaller than the prescribed value (No at S226), the communication control unit 2174 notifies the flight control unit 2173 to continue a flight. If the strengths of the radio signals of the base station 23 are greater than or equal to the prescribed threshold (Yes at S226), the communication control unit 2174 notifies the output unit 214 that the strengths of the radio signals are greater than or equal to the prescribed threshold. The output unit 214 outputs announcement information to the flight control device 22 via the base station 23 of the mobile telephone network (S228).

Recently, there have been increasing numbers of people who enjoy climbing as a hobby or a recreation. On the other hand, there is a possibility of an unexpected accident occurring in a natural area. For this reason, many people carry communicable portable terminals such as portable phones as emergency communication means. However, in many cases, the portable terminals may be out of a communicable area and thus may not perform communication in the mountains. For example, in a case where the portable terminals depart from the communicable area, a technique for transmitting data to a server via another neighboring portable terminal is disclosed.

For example, communication between terminals is performed using Bluetooth (a registered trademark), and data is transmitted/received between the terminal and another neighboring portable terminal. However, in a case where a user is involved in an accident outside the communicable area, it is not always that another climber is within a range within which the portable terminal owned by the user is communicable. Further, even if another portable terminal is in a vicinity, when another portable terminal is also out of the communicable area, the portable terminal cannot communicate with the server.

As described above, the output unit 214 of the flying device 21 in the present embodiment outputs the announcement information that includes the positional information about its own device at the time of receiving the response signal of the portable terminal M. For this reason, the search party that searches for a person in distress having the portable terminal M can identify that the portable terminal M locates around the position when the communication control unit 2174 of the flying device 21 receives the response signal. That is, even in a case where no other portable terminal M in the vicinity, a position of the portable terminal M of the person in distress can be identified.

In the above description, the operation of the flying device 21, the operation of the flight control device 22, and the method in which the position identification system S identify the position of the portable terminal is given by way of example.

Hereinafter, other methods of identifying the position of the portable terminal M will be described in detail.

[First Method of Identifying Position of Portable Terminal M]

A first method of identifying the position of the portable terminal M is a method in which the communication control unit 2174 transmits a plurality of announcement signals at a plurality of different timings, and receives a plurality of response signals to the plurality of announcement signals.

Figure 13:
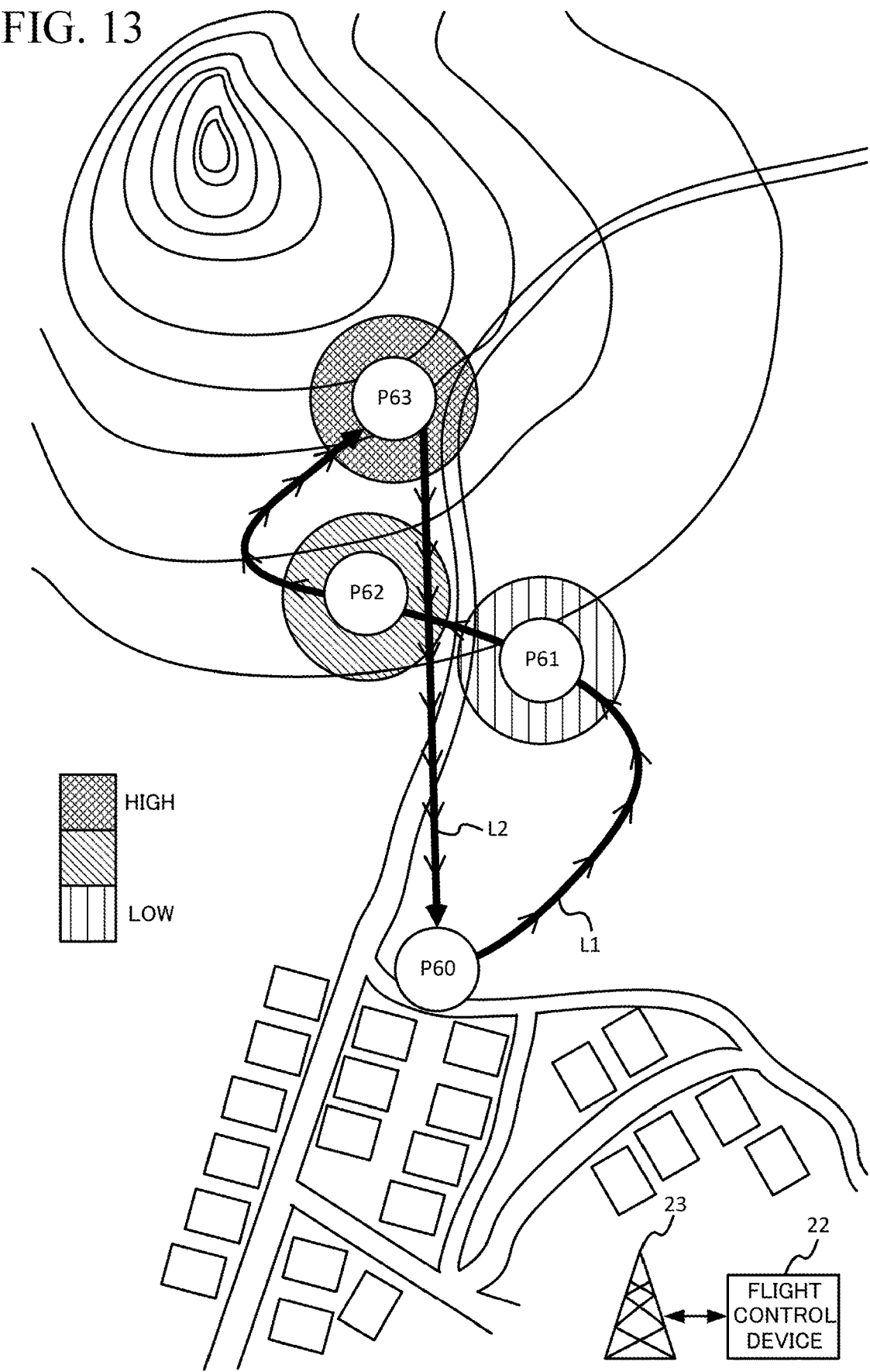
FIG. 13 is a diagram illustrating a method of receiving a plurality of response signals in the second embodiment.

FIG. 13 is a diagram illustrating a method of receiving a plurality of response signals in the second embodiment. The flying device 21 flies along the flight path L1 and the flight path L2. A position P60 indicates a starting point of the flying device 21. An area filled with a longitudinal line in FIG. 13 is an area where the radio signal strength of the response signal which the communication control unit 2174 receives is at a low level. An area filled with an oblique line in FIG. 13 is an area where the radio signal strength of the response signal which the communication control unit 2174 receives is at a medium level. An area filled with a rhombic shape in FIG. 13 is an area where the radio signal strength of the response signal which the communication control unit 2174 receives is at a high level.

When the communication control unit 2174 of the flying device 21 detects that the flying device enters the area where the radio signals of the base station 23 do not reach, the communication control unit 2174 transmits the announcement signal at a fixed interval. The communication control unit 2174 transmits the announcement signal and receives the response signal at positions P61 to P63. Referring to FIG. 13, radio signal strength of the response signal which the communication control unit 2174 receives at the position P61 is at a low level. A radio signal strength of the response signal which the communication control unit 2174 receives at the position P62 is at a medium level. A radio signal strength of the response signal which the communication control unit 2174 receives at the position P63 is a high level.

The position of the portable terminal M is considered to be close to a position at which a response signal with a highest level of radio signal strength is received. Thus, the communication control unit 2174 transmits, to the output unit 214, announcement information which includes the positional information indicating the position P63 at which a response signal with a highest radio signal strength at the time of receiving of a plurality of response signals is received. The output unit 214 outputs the announcement information that includes the positional information at the time of receiving the response signal with a highest radio signal strength when receiving a plurality of response signals. Thereby, the search party can identify that the portable terminal M that is a search target is locates around a position that indicates a flight position included in the announcement information.

[Second Method of Identifying Position of Portable Terminal M]

Figure 14:
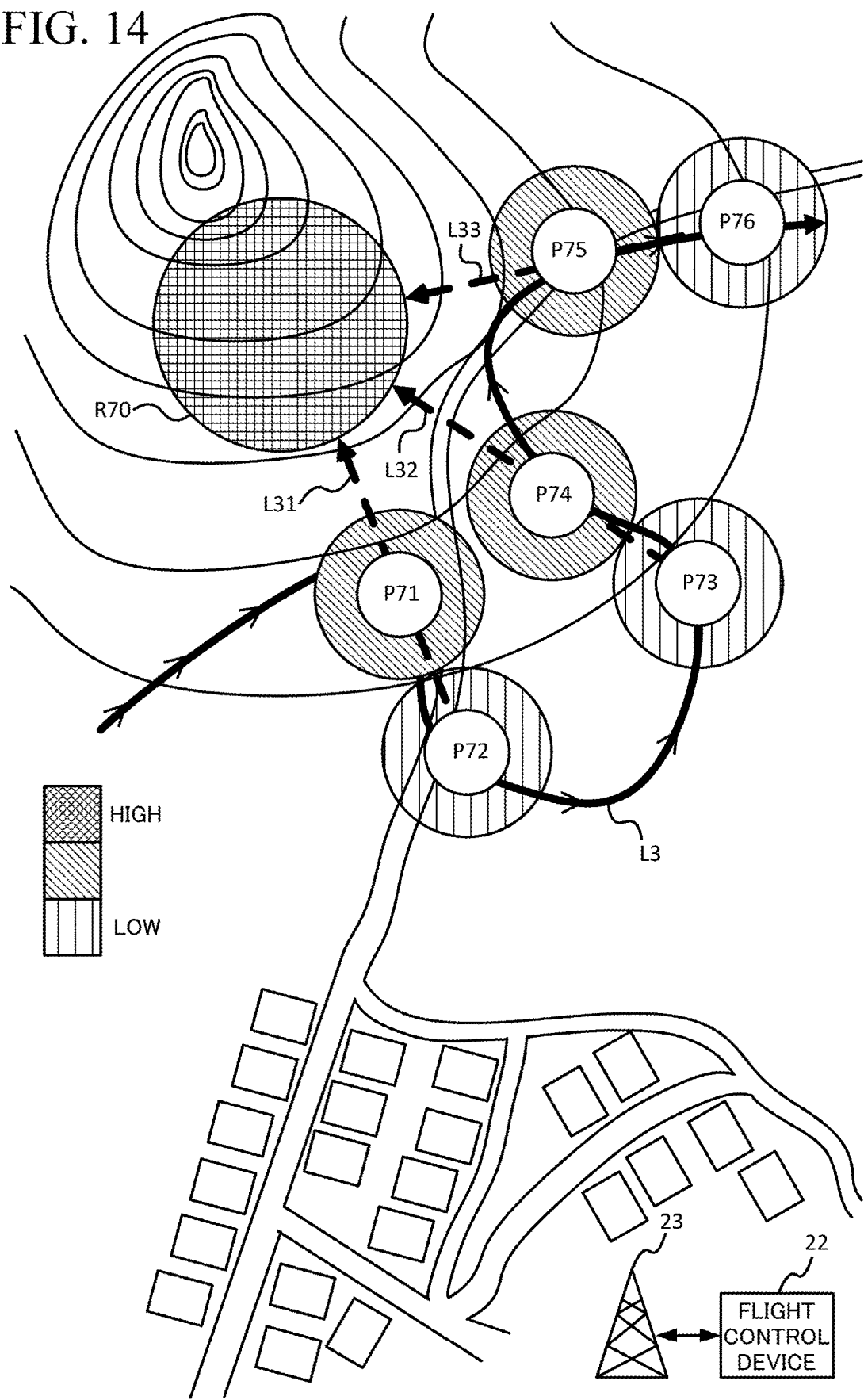
FIG. 14 is a diagram illustrating a method of acquiring a plurality of boundary positions between strengths of radio signals in the second embodiment.

A second method of identifying the position of the portable terminal M is a method of acquiring a plurality of boundary positions between strengths of radio signals and identifying a region in which the portable terminal M is located. FIG. 14 is a diagram illustrating a method of acquiring a plurality of boundary positions between strengths of radio signals in the second embodiment. The flight control unit 2173 of the flying device 21 controls the flying mechanism 215 to make a flight along a flight path L3. A region filled with a longitudinal line in FIG. 14 is a region where the radio signal strength of the response signal which the communication control unit 2174 receives is at a low level. A region filled with an oblique line in FIG. 14 is a region where the radio signal strength of the response signal which the communication control unit 2174 receives is at a medium level.

The communication control unit 2174 transmits the announcement signal and receives the response signal at positions P71 to P76. Referring to FIG. 14, radio signal strength of the response signal which the communication control unit 2174 receives at the positions P72, P73 and P76, is at a low level that is smaller than a prescribed value. A radio signal strength of the response signal which the communication control unit 2174 receives at the positions P71, P74 and P75 is at a medium level that is greater than or equal to the prescribed value.

In the above description, the flying device 21 detects the radio signal strength of the response signal, but the portable terminal M may detect radio signal strength of the announcement signal. The portable terminal M can transmit the response signal to the flying device 21 along with radio signal strength information that includes the detected radio signal strength of the announcement signal. Thereby, the flying device 21 can acquire, from the portable terminal M, the radio signal strength of the announcement signal which the portable terminal M receives.

In a case where boundary positions of a plurality of radio signals are acquired, a method of identifying the position of the portable terminal M that is a search target on the basis of the boundary positions between strengths of the plurality of radio signals will be described. The position P71 at which the radio signal strength is greater than or equal to the prescribed value and the position P72 at which the radio signal strength is smaller than the prescribed value are positions around a boundary at which the radio signal strength of the response signal varies. A radio signal of the response signal which the portable terminal M outputs becomes stronger as a distance between the flying device 21 and the portable terminal M becomes shorter. The portable terminal M is considered to be located in a direction directed from the position P72 to the position P71. Thus, the communication control unit 2174 identifies that a region where the portable terminal M may be located is in a direction directed from the position P72 to the position P71 indicated by an arrow L31.

Likewise, the portable terminal M is considered to be located in a direction directed from the position P73 to the position P74 and a direction directed from the position P76 to the position P75. The communication control unit 2174 identifies that a region where the portable terminal M may be present is located in a direction directed from the position P73 to the position P74 indicated by an arrow L32 and a direction directed from the position P76 to the position P75 indicated by an arrow L33. The communication control unit 2174 identifies that a region R70 filled with a grid located in directions indicated by the arrows L31, L32 and L33 is the region where the portable terminal M may be located.

The communication control unit 2174 notifies the output unit 214 of announcement information that includes the region R70 which is filled with a grid, which is the region where the portable terminal M may be located, and which is identified on the basis of the radio signal strength of the response signal at a plurality of positions around the boundary at which the strengths of radio signals vary. The output unit 214 outputs, to the flight control device 22 used by the search party, the announcement information which includes the region where the portable terminal M may be located.

Thereby, the search party can make a search while narrowing the region where the portable terminal M may be located.

[Third Method of Identifying Position of Portable Terminal M]

A third method of identifying the position of the portable terminal M is a method of identifying the region in which the portable terminal M is present on the basis of a plurality of response signals. When a radio signal coverage of the announcement signal which the communication control unit 2174 of the flying device 21 transmits is wide, even if the position at which the communication control unit 2174 receives the response signal from the portable terminal M is found, the search party has to make a wide search. Thus, a method in which the flying device 21 identifies the region where the portable terminal M is present into a narrow region on the basis of a plurality of response signals will be described.

FIG. 15 is a diagram illustrating a method of identifying the region where the portable terminal M is present on the basis of a plurality of response signals in the second embodiment. The communication control unit 2174 of the flying device 21 transmits the announcement signal and receives the response signal at positions P81, P82 and P83. A radio signal coverage R81 indicates a coverage of the radio signal of the announcement signal which the communication control unit 2174 of the flying device 21 transmits at the position P81. Likewise, radio signal coverages R82 and R83 indicate coverages of the radio signals of the announcement signals which the communication control unit 2174 of the flying device 21 transmits at the positions P82 and P83.

As previously described, the portable terminal M that is a search target is within the radio signal coverage of the announcement signal transmitted by the communication control unit 2174 of the flying device 21. Therefore, the portable terminal M is thought to be within a search range R84 where the radio signal coverage R81, the radio signal coverage R82, and the radio signal coverage R83 overlap one another. Thus, the communication control unit 2174 of the flying device 21 identifies the search range R84, and notifies the output unit 214 of announcement information including the search range R84. The output unit 214 outputs the announcement information including the search range R84 to the flight control device 22 which the search party uses. Thereby, the search party can identify the range within which the portable terminal M that is a search target is present into a narrow range.

In the above description, one flying device 21 transmits the announcement signal and receives the response signal at the plurality of positions. However, without being limited thereto, a plurality of flying devices 21 may receive the response signal at different positions.

[Fourth Method of Identifying Position of Portable Terminal M]

A fourth method of identifying the position of the portable terminal M is a method of controlling a direction of an antenna to identify a transmitting direction of a radio signal of a response signal. The flying device 21 has an antenna that transmits an announcement signal, and can direct a direction of the antenna in a specific direction. The communication control unit 2174 of the flying device 21 detects radio signal strength of a response signal to the announcement signal in accordance with the direction of the antenna. The output unit 214 outputs announcement information including positional information, the direction of the antenna, and the radio signal strength of the response signal to the announcement signal corresponding to the direction of the antenna. Thereby, the search party can identify a direction of the radio signal of the response signal which the portable terminal M transmits and a distance based on the radio signal strength with respect to a position of the flying device 21 when the response signal is received.

[Fifth Method of Identifying Position of Portable Terminal M]

A fifth method of identifying the position of the portable terminal M is a method of identifying a place of the portable terminal M on the basis of a distance from the ground. When the communication control unit 2174 receives a response signal to an announcement signal, the communication control unit 2174 acquires a flying altitude of its own device and a reception intensity of the response signal which the detection unit 211 detects. The communication control unit 2174 identifies a region where the portable terminal M may be present on the basis of the flying altitude of its own device and the reception intensity of the response signal.

To be specific, the communication control unit 2174 identifies a right-angled triangular shape in which the flying altitude "h" of its own device is set to a height and a distance "r" based on the radio signal strength of the response signal is set to a hypotenuse. The communication control unit 2174 identifies a linear distance "a" between the portable terminal M and a point P at which a perpendicular drawn from a flight position of its own device to the ground intersects the ground on the basis of the following formula.

$$a^2 = r^2 - h^2$$

The communication control unit 2174 identifies the inside of a circle whose center is the point P and whose radius is the linear distance "a" between the point P and the portable terminal M, as the region where the portable terminal M may be located. The communication control unit 2174 notifies the output unit 214 of announcement information including the identified region. Thereby, the search party can identify the region where the portable terminal M may be located.

[Sixth Method of Identifying Position of Portable Terminal M]

A sixth method of identifying the position of the portable terminal M is a method in which a plurality of flying devices 21 appropriately changing flight paths. The flying device 21 can mutually communicate with other flying devices 21, and transmits/receives flight path information including the flight path.

The communication control units 2174 of the plurality of flying devices 21 establish a communication line with the communication control units 2174 of the other flying devices 21 to transmit/receive the flight path information including the flight path. For example, the communication control unit 2174 of the flying device 21*a* transmits a flight path of its own device to the flying device 21*b* that is flying in the neighborhood. When the control unit 217 of the flying device 21*b* receives the flight path of the flying device 21*a*, the control unit 217 of the flying device 21*b* compares the received light path with the flight path of its own device. The flight control unit 2173 of the flying device 21*b* does not change the flight path of its own device if the flight path of the flying device 21*a* and the flight path of its own device do not overlap with each other. The flight control unit 2173 of the flying device 21*b* changes the flight path of its own device if the flight path of the flying device 21*a* and the flight path of its own device overlap with each other. The flight control unit 2173 of the flying device 21*b* may transmit instruction information that instructs the flight path to the flying device 21*a* via the communication control unit 2174 in the case where the flight path of the flying device 21a and the flight path of its own device overlap with each other.

Thereby, the plurality of flying devices 21 make a flight such that the flight paths thereof do not overlap one another, and can transmit the announcement signals. Therefore, the search party can identify the position of the portable terminal M without setting detailed flight paths for the plurality of flying devices 21.

The description has been made according to the first and second embodiments. New embodiments generated by a combination of these embodiments are included in the embodiments of the present invention. By combining the first and second embodiments, even in the case where the communication quality of the mobile telephone network is changed, the flying device 21 can be controlled, and the position of the portable terminal M of a person in distress can be identified in a case where another portable terminal M is not present in the neighborhood.

While the present invention has been described using embodiments, the technical scope of the present invention is not limited to the scope described in the embodiments. It is apparent to those skilled in the art that the embodiments can be modified or improved in various ways. Especially, specific embodiments of a separate or integrated device are not limited to the drawings, and all or part of the device may be configured by functionally or physically separating or integrating any of the units depending on various additions or functional loads.

INDUSTRIAL APPLICABILITY

According to the present invention, it is possible to control a flying device even if the communication quality of a mobile telephone network is changed.

REFERENCE SYMBOLS

11 Flying device
111 Communication unit
112 Flying mechanism
113 Flight position identification unit
114 Environment identification unit
118 Storage unit
119 Control unit
1191 Communication control unit
1192 Acquisition unit
1193 Flying control unit
1194 Detection unit
1195 Compensation unit
1196 Route determination unit
21 Flying device
22 Flying control device
23 Base station
211 Detection unit
212 Image-capturing unit
213 Communication unit
214 Output unit
215 Flying mechanism
216 Storage unit
217 Control unit
221 Communication unit
222 Output unit
223 Storage unit
224 Control unit
2171 Positional information acquisition unit
2172 Information acquisition unit
2173 Flying control unit
2174 Communication control unit
2241 Information transmitter
2242 Information receiver
M Portable terminal
S Position identification system

The invention claimed is:

1. A flying device comprising:
at least one memory configured to store instructions; and
at least one processor configured to execute the instructions to:
  receive control information transmitted by a control device for controlling the flying device;
  acquire communication quality information with which positional information indicating a position and strength of radio signals, in which a base station of a mobile telephone network transmits, at the position indicated by the positional information are associated;
  identify a flight position that is an in-flight position; and
  control a flying mechanism on the basis of the received control information when the radio signals transmitted by the base station can be received, determine, in response to a case where the radio signals transmitted by the base station cannot be received, a presence or absence of the control information received within a predetermined period, control the flying mechanism based on the control information when there is the control information received within the predetermined period, determine the flight path toward a position, which comes closest to the identified flight position, among positions at which communication quality is greater than or equal to a threshold on the basis of the communication quality associated with the positional information corresponding to the flight position in the communication quality information that is acquired when there is no control information received within the predetermined period, and control the flying mechanism on the basis of the determined flight path.

2. The flying device according to claim 1, wherein the at least one processor is configured to execute the instructions to determine the flight path in a direction of a position at which the communication quality of a radio communication line through which the control information is transmitted is greater than or equal to the threshold.

3. The flying device according to claim 1, wherein
the at least one memory is configured to store the destination, and
the at least one processor is configured to execute the instructions to determine the flight path that includes a position at which the communication quality between the flight position and the destination is greater than or equal to the threshold.

4. The flying device according to claim 3, wherein the at least one processor is configured to execute the instructions to determine the flight path that includes a position in a direction closest to a direction of the destination among positions at which the communication quality is greater than or equal to the threshold.

5. The flying device according to claim 1, wherein
the at least one processor is further configured to execute the instructions to identify an ambient environment of the flight position, and
the at least one processor is configured to execute the instructions to determine the flight path further on the basis of the identified ambient environment.

6. The flying device according to claim 5, wherein the at least one processor is configured to execute the instructions to determine the flight path that includes a position at which the ambient environment meets a prescribed condition among positions at which the communication quality is greater than or equal to the threshold.

7. The flying device according to claim 1, wherein the at least one processor is configured to execute the instructions to determine the flight path in a direction to an area where a radio signal strength is greater than or equal to a threshold in the case where the radio signals transmitted by the base station cannot be received.

8. The flying device according to claim 7, wherein the at least one processor is configured to execute the instructions to change the flight path on the basis of a remaining battery level of the flying device.

9. The flying device according to claim 1, further comprising:
a subscriber identity module card;
wherein the communication quality information corresponds to a frequency to which a communication unit of the flying device based on the subscriber identity module card corresponds.

10. The flying device according to claim 9, wherein the at least one processor is configured to execute the instructions to change the flight path on the basis of a remaining battery level of the flying device.

11. The flying device according to claim 1, wherein the at least one processor is configured to execute the instructions to determine the flight path on the basis of a remaining battery level of the flying device.

12. A flying control method causing a computer to execute processes, the processes comprising:
receiving control information transmitted by a control device for controlling a flying device;
acquiring communication quality information with which positional information indicating a position and strength of radio signals, in which a base station of a mobile telephone network transmits, at the position indicated by the positional information are associated;
identifying a flight position that is an in-flight position; and
controlling a flying mechanism on the basis of the received control information when the radio signals transmitted by the base station can be received, determining, in response to a case where the radio signals transmitted by the base station cannot be received, a presence or absence of the control information received within a predetermined period, controlling the flying mechanism based on the control information when there is the control information received within the predetermined period, determining the flight path toward a position, which comes closest to the identified flight position, among positions at which communication quality is greater than or equal to a threshold on the basis of the communication quality associated with the positional information corresponding to the flight position in the communication quality information that is acquired when there is no control information received within the predetermined period, and controlling the flying mechanism on the basis of the determined flight path.

13. The flying control method according to claim 12, wherein, in the determining, the flight path is determined in a direction of a position at which the communication quality of a radio communication line through which the control information is transmitted is greater than or equal to the threshold.

14. The flying control method according to claim 12, further comprising:
storing the destination;
wherein, in the determining, the flight path, which includes a position at which the communication quality between the flight position and the destination is greater than or equal to the threshold, is determined.

15. The flying control method according to claim 12, further comprising:
identifying an ambient environment of the flight position;
wherein, in the determining, the flight path is determined further on the basis of the ambient environment identified in the identifying.

16. The flying control method according to claim 12, wherein the communication quality information corresponds to a frequency to which a communication unit of the flying device based on a subscriber identity module card installed in the flying device corresponds.

17. The flying control method according to claim 16, further comprising:
changing the flight path on the basis of a remaining battery level of the flying device.

18. The flying control method according to claim 12, wherein, in the determining, the flight path is determined on the basis of a remaining battery level of the flying device.

* * * * *